US007020758B2

(12) United States Patent
Fisk

(10) Patent No.: US 7,020,758 B2
(45) Date of Patent: Mar. 28, 2006

(54) CONTEXT SENSITIVE STORAGE MANAGEMENT

(75) Inventor: David C. Fisk, Redondo Beach, CA (US)

(73) Assignee: Ortera Inc., Redondo Beach, CA (US)

( * ) Notice: Subject to any disclaimer, the term of this patent is extended or adjusted under 35 U.S.C. 154(b) by 273 days.

(21) Appl. No.: 10/247,261

(22) Filed: Sep. 18, 2002

(65) Prior Publication Data

US 2004/0054850 A1 Mar. 18, 2004

(51) Int. Cl.
*G06F 12/00* (2006.01)

(52) U.S. Cl. ........................... 711/172; 711/114; 711/5

(58) Field of Classification Search ........ 711/111–114, 711/5, 202–203; 710/22, 52; 365/185.11
See application file for complete search history.

(56) References Cited

U.S. PATENT DOCUMENTS

| | | | | |
|---|---|---|---|---|
| 5,455,934 | A * | 10/1995 | Holland et al. | 711/4 |
| 5,991,197 | A * | 11/1999 | Ogura et al. | 365/185.11 |
| 6,016,522 | A * | 1/2000 | Rossum | 710/52 |
| 6,269,410 | B1 * | 7/2001 | Spasojevic | 710/5 |
| 6,496,878 | B1 * | 12/2002 | Azevedo et al. | 710/22 |
| 6,549,995 | B1 * | 4/2003 | Schulz et al. | 711/202 |
| 6,571,310 | B1 * | 5/2003 | Ottesen et al. | 711/5 |
| 6,584,571 | B1 * | 6/2003 | Fung | 713/310 |
| 6,651,125 | B1 * | 11/2003 | Maergner et al. | 710/244 |
| 6,718,434 | B1 * | 4/2004 | Veitch et al. | 711/114 |
| 6,785,767 | B1 * | 8/2004 | Coulson | 711/112 |
| 6,799,253 | B1 * | 9/2004 | Peterson | 711/150 |
| 2002/0128815 | A1 * | 9/2002 | Merchant et al. | 704/2 |
| 2004/0044744 | A1 * | 3/2004 | Grosner et al. | 709/217 |

OTHER PUBLICATIONS

The design and performance evaluation of the RAID 5 controller using the load-balanced destage algorithm Yun-Seok Chang; Chong-Sang Kim; Parallel and Distributed Systems, 1997. Proceedings., 1997 International Conference on, Dec. 10-13, 1997; pp.: 28-34.*

The net disk architecture for dynamic load balancing among disk arrays Kakeshita, T.; Zhang, S.; Parallel and Distributed Systems, 2000. Proceedings. Seventh International Conference on, Jul. 4-7, 2000; pp.: 315-322.*

* cited by examiner

*Primary Examiner*—Nasser Moazzami
(74) *Attorney, Agent, or Firm*—Michael A. Glenn; Glenn Patent Group

(57) ABSTRACT

The invention relates to methods and associated systems for managing application workloads and data storage resources. Data storage resources my be mapped to logical addresses associated with applications based on the I/O activity associated with those addresses. Techniques are disclosed for determining the I/O capacity of a data storage resource for a given workload and allocating resources according to administrator requirements. Various physical devices may be mapped to logical addresses by defining a composite volume for the application. The invention may be implemented as a transparent layer between the application and the data storage resource, for example, in the file system.

24 Claims, 25 Drawing Sheets

Interface Boundaries

CONTEXT SENSITIVE STORAGE MANAGEMENT

FIELD OF THE INVENTION

The invention relates generally to the field of data storage systems and, more particularly, to systems and methods for managing data storage resources.

BACKGROUND

Conventional data storage management tasks include configuring and allocating resources in a data storage system and an associated processing system (e.g., a computing system) to achieve a desired level of performance in the combined system. Thus, managing data storage resources may involve managing components of the data storage system and/or components that use the data storage system.

A data storage system may include one or more data storage components such as disk drives and solid state devices. A data storage system also may include components that control access to the data storage components. For example, a data storage system may include several data storage components and these components may be distributed throughout a data network. In this case, control components may manage the transmission of data between the computing system and each of the data storage components. This scheme may be used to isolate the computing system from the details of how that data is stored on the data storage components and which data storage components actually store the data. Thus, the computing system may simply send data to and receive data from the data storage system, not the individual components. One advantage of this scheme is that the control components may reconfigure how and where data is stored in the data storage system without modifying the computing system or application programs executing on the computing system.

In a conventional computing system, application programs (hereafter "applications") executing on a processor use a data storage system by accessing data and/or data files stored in the data storage system. For example, a database application operates in conjunction with a database of information that may be stored in the data storage system. During the execution of the database application, various processes of the application access data in the database.

The task of allocating physical resources (e.g., disk drives) to logical entities (e.g., application data addresses) is called schema mapping, or logical to physical schema design. One example of a typical schema is: "The employee table of the HR database allocated to tablespace01 on datafile01 on logical volume VOL01, which is a RAID-10.4+4@32 KB device, 500 GB size." Thus, the schema defines where the logical entity "employee table" will physically reside: "VOL01," and the size of the disk drive: "500 GB."

Administrators of computing systems continually strive to ensure that their computing and data storage systems are as efficient as possible. On the one hand, an administrator should use a data storage system with sufficient capacity (e.g., input/output (I/O") capacity) so that applications executing on the computing system will execute at a reasonable speed. When a system is configured with too many applications vying for the services of the data storage system, the response time of the system may be undesirably long because the applications must wait for their turn to access the data storage system. On the other hand, an administrator should avoid buying a data storage system with excess capacity. Otherwise, the storage system may be under used, resulting in a waste of valuable resources.

One important capacity parameter of a data storage system is I/O capacity. Some techniques that have been employed to improve I/O capacity in database applications include separating the data and the index of the database, spreading the storage load as evenly as possible and allocating frequently used data objects to different physical resources.

An administrator's ability to manage a data storage system may be adversely impacted by the complexities of the components of the data storage system. For example, an administrator may not fully understand the operation of complex components such as redundant array of independent disks ("RAID") arrays, storage area network ("SAN") name servers, storage virtualization devices, host device trees, redundant path name facilities, and host volume management.

Moreover, layers of software protocol may obscure the very identity of the components. For example, each layer of software protocol may provide its own name by which the component is known.

Due to the ever increasing size, number and complexity of data components used in modern data storage systems, it has become difficult for administrators to manage the design and the growth of enterprise applications, let alone optimize the applications. Such difficulties may result in a relatively high cost of ownership due to the number of person-hours spent managing the system and due to application down time. Accordingly, a need exists for improved management techniques for data storage systems.

SUMMARY

The invention relates to methods and systems for managing application workloads and data storage resources. For example, one embodiment of a system constructed according to the invention allocates data storage resources (e.g., hardware and/or software for storing data) to applications to achieve desired levels of system performance. To this end, various embodiments for mapping I/O demand to I/O capacity, determining response times in the system and allocating the application workload and/or system resources are described.

One embodiment of a system constructed according to the invention maps data storage resources to logical addresses associated with applications based on the I/O activity associated with those addresses. Initially, the system monitors I/O activity associated with an application. This includes maintaining a log of the logical addresses associated with that I/O activity. Next, the system determines which types of physical devices may be advantageously used to service the I/O for those addresses. For example, a solid state device may be identified as best serving some addresses in the logical address space while disk drives are identified as best serving other addresses in the logical address space. The system then maps these physical devices to the appropriate logical addresses.

One embodiment of a system constructed according to the invention maps the physical devices to the appropriate logical addresses by defining a composite volume for the application. For example, the system may concatenate the various physical devices into a single logical volume.

Further to these embodiments, various embodiments of systems constructed according to the invention relate to analyzing I/O activity, identifying appropriate physical devices and mapping physical devices to logical addresses.

For example, one method for analyzing I/O activity and identifying appropriate physical devices involves determining the I/O capacity of the data storage resources for a given complex application workload, then selecting data storage resources that will provide a desired level of performance for that workload. A root of the problem to be solved here is that data storage resources have a limited I/O capacity (e.g., maximum I/O throughput). At a given point in time the I/O throughput of a data storage resource depends on the application workload. The application workload may relate, in turn, to the number of concurrent requests pending in the system and the types of data requests in the system.

The number of concurrent requests may affect the response times of the data requests associated with the application workload. For example, as the number of concurrent requests increases in a system, the response time for each request will increase once the I/O capacity of the data storage resource has been reached. In other words, beyond this point less I/O throughput will be available for each request.

Different types of data requests may present different loads to a data storage resource. For example the throughput for a random read of 8 kilobytes ("Kbytes") may differ from the throughput for a random write of 64 Kbytes. In practice, a workload in a system typically is complex. That is, the workload consists of many types of requests. Thus, the throughput of a data storage resource may depend on the complexity of the workload.

In accordance with one embodiment of the invention, techniques are provided for determining the response time of a data storage resource when the data storage resource is servicing a complex workload. First, the effects of individual workloads on the data storage resource are computed over a range of concurrent workload conditions. Second, these effects are then combined using probability distribution data and linear operations to determine a cumulative response time of the resource. Third, an estimate is calculated of the response time for a given workload when the resource is servicing the complex workload.

Once the I/O performance of the system is characterized, appropriate physical devices may then be identified to provide a desired level of performance. Thus, one embodiment of the invention relates to techniques for allocating the workload and/or the data storage resources to provide a desired level of system performance. Here, an administrator may define desired operating conditions of the system. For example, the administrator may define a maximum utilization level and/or a maximum response time for a given workload when the resource is servicing a complex workload. Using techniques complementary to those discussed above the administrator may then calculate, for example, the number of components of a data storage resource over which a given workload should be spread (e.g., divided). In one embodiment this would involve determining a minimum stripe width for a RAID data storage resource. This also may involve providing a solid state device to handle heavy I/O traffic. In summary, using these techniques an administrator may determine how to configure the system to provide a desired level of I/O throughput.

One embodiment of the invention relates to a storage management system implemented as a transparent layer between an application and a data storage resource. For example, the storage management system may be implemented in the file system. Thus, the storage management system may track details of the I/O calls (e.g., I/O types and associated logical addresses) and system performance associated with those I/O calls. Accordingly, the storage management system has access to the data and resources needed to determine the I/O capacity of the data storage resource for a given workload and allocate resources according to administrator requirements.

Significantly, the storage management system may be combined with an existing file system. That is, the software for the storage management system need not provide all of the functions of a file system. Rather, the storage management system may be linked to the file system so that file system I/O calls to data storage devices are routed through the storage management system. After collecting information about the I/O calls, the storage management system then, in effect, passes the I/O calls to the data storage devices. Thus, a system constructed according to this embodiment of the invention may be seamlessly integrated into an existing system.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF ILLUSTRATIVE EMBODIMENTS OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
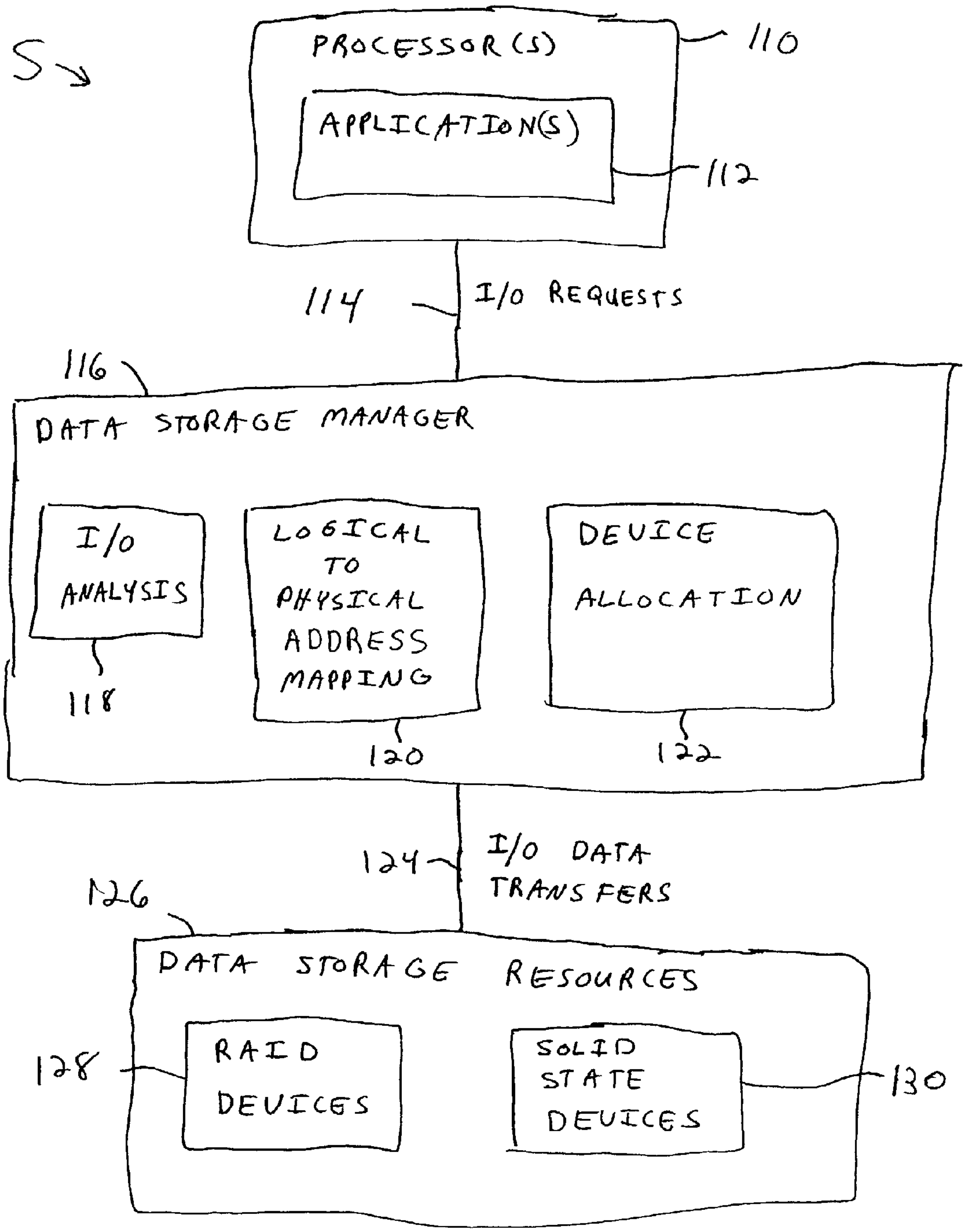
FIG. 1 is a block diagram of one embodiment of a data storage system constructed in accordance with the invention.

FIG. 1 is a block diagram of one embodiment of a data storage system S constructed in accordance with the invention. Applications 112 executing on one or more processors 110 access data stored in one or more data storage resources 126. A data storage manager 116 controls access to the data, monitors the data transfers (represented by line 124) and allocates data storage resources 126 to the applications 112. In accordance with one embodiment of the invention, the data storage manager 116 allocates the data storage resources 126 to logical data addresses used by the applications 112 according to the I/O activity associated with those logical data addresses. To this end, the data storage manager 116 includes components for I/O analysis 118, logical to physical address mapping 120 and device allocation 122.

The I/O analysis component 118 analyzes the I/O throughput for the data transfers in the system S. The I/O throughput in the system S depends, in part, on the characteristics of the data storage resources 126, the workloads associated with the applications 112 and the number of concurrent I/O requests (represented by line 114) in the system S. These three aspects of the system will be discussed briefly.

A data storage resource 126 consists of hardware and/or software for storing data. For example, data storage resources may include disk arrays, solid state devices 130, tapes, robots, switches, associated firmware and/or software. Data storage resources also may include software resources in a computing system (e.g., processor 110) such as logical volumes, and file system and kernel parameters relative to the I/O subsystem.

A typical data storage device as depicted in FIG. 1 consists of a RAID device 128. There are several levels of RAID devices such as level 1 (e.g., RAID-1) and level 5 (e.g., RAID-5). By definition, a RAID device consists of an array of data storage disks. RAID devices may provide relatively high I/O throughput by storing a portion of the data for a given application on each of the disks in the array. Thus, the data storage manager 116 may access the data in parallel, concatenate the data, and send the concatenated data to the application 112. Significant attributes of RAID devices include stripe size and stripe width. In general, stripe size refers to the largest amount of data stored on a given disk for a stripe. That is, accesses to a disk are made in increments of the stripe size. In general, stripe width refers to the number of parallel disks that are used to store a given unit of data (referred to as a "stripe"). Thus, I/O performance may be improved by using a wider stripe width.

The workload associated with an application depends on the processes being performed by the application. For example, a database application may perform operations related to generating an index of the data items in the database. In addition, the database application may perform operations related to reading data items from and writing data items to the database.

A workload may be characterized, for example, by the types of data accesses associated with each operation. In general, data accesses consist of four types: random read, random write, sequential read and sequential write. In addition, data accesses may read or write different quantities of data. For example, an 8K random read reads 8 Kbytes of data. A 64K random write writes 64 Kbytes of data.

Typically, the amount of time it takes for a data storage resource to complete a request (i.e., the response time for the request) depends on the type of the I/O request. For example, an 8K sequential read may have a faster response time than a 64K random write.

The number of concurrent I/O requests to a data storage resource also may affect the response time of the system. This is because there is a finite limit on the amount of data that may be read from or written to the data storage resource at a given moment in time. This limit is due in large part to the physical limits on the rate at which data may be read from or written to a disk drive. Accordingly, as the number of concurrent I/O requests to a data storage resource increases, at some point the I/O capacity of the data storage resource may be reached. If the number of concurrent I/O requests continues to increase past this point, some of the I/O requests will be queued to enable the data storage resource to service prior requests. As a result, the response time for completing the I/O requests will increase.

As the above illustrates, the response time of a system is context dependent. That is, the response time may depend on a variety of factors in the system including, for example, the characteristics of the data storage resource and the number and type of concurrent I/O requests.

In one embodiment of the invention, the I/O analysis component 118 estimates the response time of a workload on a data storage resource servicing a complex workload. A system administrator may use this information to configure the system to provide a desired level of performance.

In accordance with one embodiment of the invention, the data storage manager 116 allows the administrator to define a desired system performance and then estimate, based on system I/O performance, an appropriate mapping of data storage resources to application workload to achieve the desired system performance. For example, a desired level of performance may be achieved by spreading the workload of an application across several data storage devices. The teachings herein may be used to determine, for a given data storage resource and complex workload, the number of data storage devices across which a particular application workload should be spread. The administrator may then use the device allocation component 122 to allocate physical devices to the I/O activity. Moreover, through the logical to physical address mapping component 120, the administrator may map different logical addresses to different physical devices depending on the results of the I/O analysis.

Figure 2:
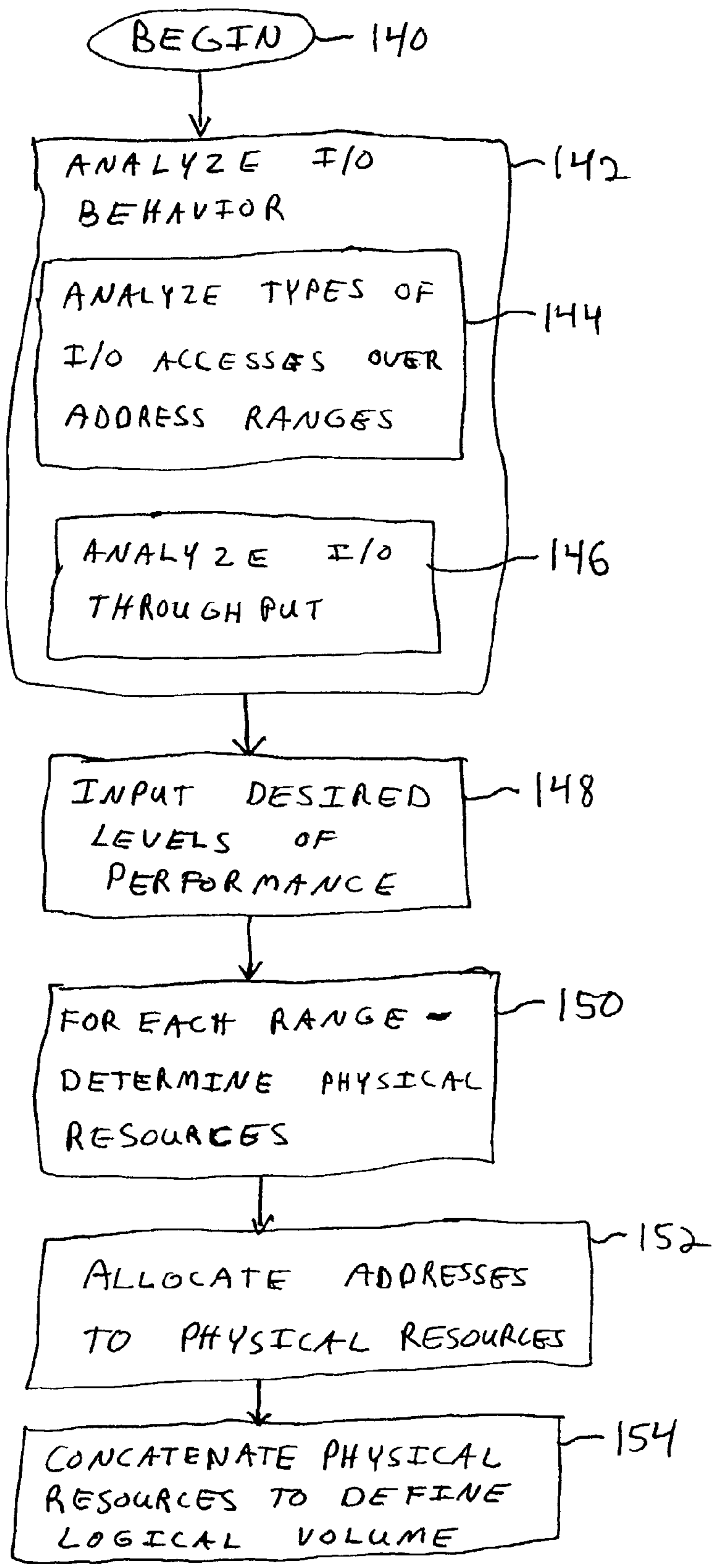
FIG. 2 is a flowchart representative of one embodiment of operations that may be performed in accordance with the embodiment of FIG. 1.

System analysis and configuration operations associated with the embodiment of FIG. 1 will be discussed in more detail in conjunction with the flowchart of FIG. 2 beginning at block 140.

As represented by block 142, the I/O analysis component 118 analyzes the I/O behavior in the system. For example, as represented by block 144 the component 118 may track the name of the application that generated the I/O activity, the type of I/O activity (e.g., 8K random write) and the logical addresses being accessed by the I/O activity. Typically, the component 118 will generate a log of this I/O activity.

As represented by block 146, the I/O analysis component 118 also may analyze the I/O throughput of the system. For example, the component 118 may track the number of concurrent I/O requests in the system and the response times for those requests. Again, the component 118 may generate a log of this I/O information.

As represented by block 148, the I/O analysis component 118 may be configured to achieve a desired level of system performance. System performance typically is defined by parameters including, for example, I/O throughput and utilization level. In one embodiment, an administrator may specify desired levels of performance by inputting this information into the system via an operator interface (not shown). This information may then be stored in the system and used to determine which physical resources should be used in the system.

The data storage manager 116 matches physical resources to logical addresses to achieve the desired level of performance. For example, a high performance physical resource may be matched with addresses that have high demand I/O activity while a low performance physical resource may be matched with addresses that have low demand I/O activity. The process of mapping demand to capacity in this way is discussed in more detail below.

It should be appreciated that the main criteria for assigning a particular physical resource to an address may be the I/O activity associated with that address. Thus, as represented by block 150, the data storage manager 116 may match physical resources to specific logical address ranges that may not fall on traditional application address space boundaries. This concept may be better understood by reference to FIG. 3 which depicts one embodiment of a logical to physical address mapping defined according to the invention.

Figure 3:
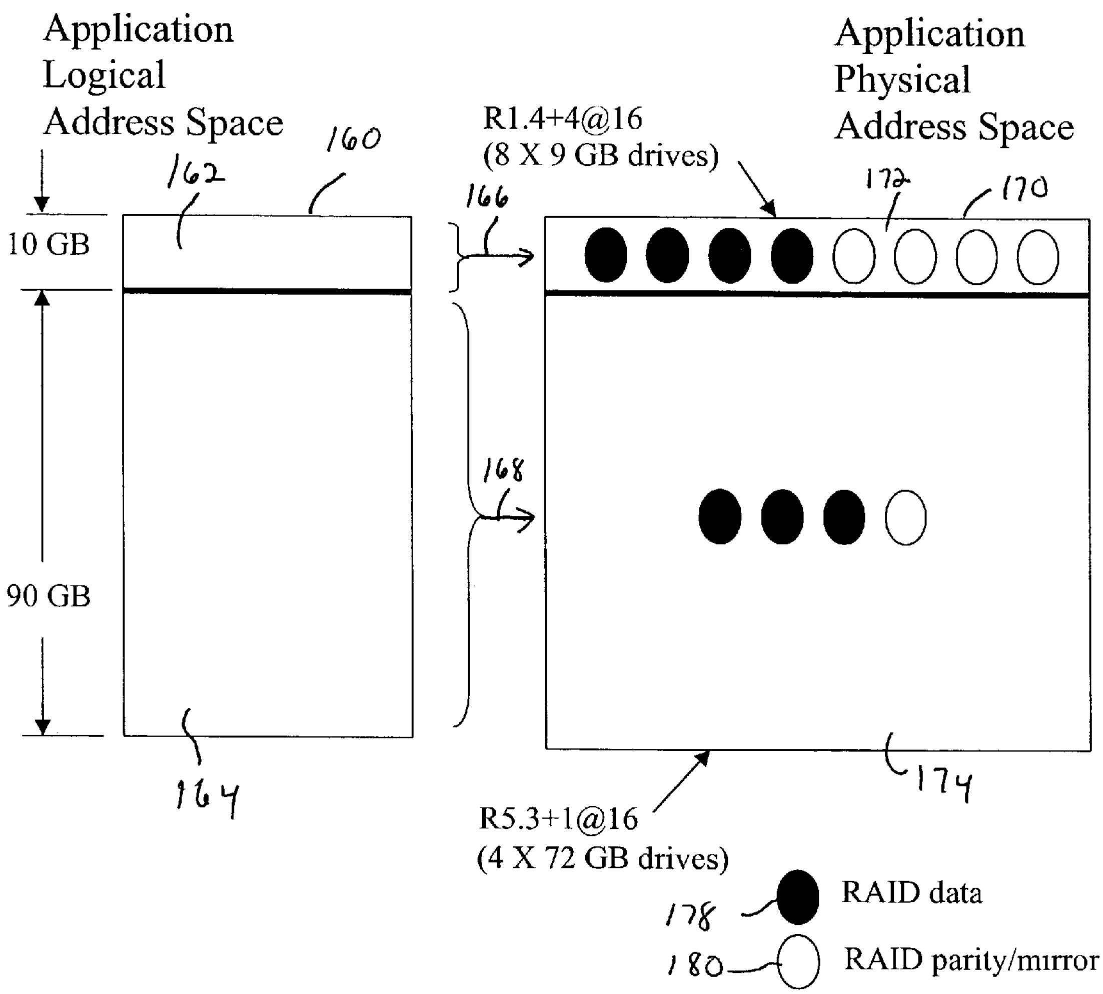
FIG. 3 is a graphical representation of one embodiment of a logical to physical address mapping in accordance with the invention.

The relationship of a computer application to its I/O subsystem is defined by the configuration of logical and physical storage resources. This may involve the choice of RAID parameters such as hardware, level, stripe width, and stripe unit. Collectively, these parameters determine where a logical I/O address of the application will physically reside. In the example of FIG. 3, an application has a logical volume 160 that is 100 GBytes ("GB") in size.

In this example it is assumed that 90% of the accesses to the volume 160 are to the first 10 GB logical address space 162. This scenario may occur, for example, in a database application where the first 10% of the volume contains tables for the database application. Even more extreme scenarios are possible. For example, the B-TREE data structures of a database application may contain 1% of the total data yet account for 80% of the accesses.

Returning to the example of FIG. 3, it is also assumed that the application is write intensive. For example, 80% of the accesses to the first 10 GB logical address space 162 of the volume 160 is 8 KB random write. This scenario may occur, for example, in an application where the first 10% of the volume is used to store log files for the application.

To optimize the I/O performance of this application, the 10 GB logical address space 162 is matched (as represent by line 166) with a relatively high throughput physical device. The remaining 90 GB logical address space 164 is matched (as represent by line 168) with a relatively low throughput physical device. Thus, one range of the logical address space is matched with one type of physical resource and another range of the logical address space is matched with another type of physical resource.

Once the desired physical resources are selected and installed in the system (if they are were not previously available), the logical to physical address mapping component 120 maps the physical resources to the addresses (block 152). Returning to the example of FIG. 3, logical address space 162 is mapped to address space 172 in the physical address space 170 and logical address space 164 is mapped to address space 174 in the physical address space 170. In one embodiment this involves modifying page lists of the VNODE structures managed by the file system to point to the same logical address on a new logical device to implement a new logical to physical address mapping. This embodiment is discussed in more detail below.

As represented by block 154, the process of mapping logical to physical address space may involve concatenating physical resources to define a logical volume. In FIG. 3 the concatenation of physical resources into a single logical volume defines a composite volume. The composite volume defined in this example is constructed from two completely separate physical RAID devices. The first RAID device is configured as stripped mirrors (RAID-1+0) having a small stripe unit and a relatively large stripe width. This is optimal for the write intensive workload of the application. As discussed above, the stripe width of this volume may be selected to satisfy the application I/O demand to the first 10 GB of the volume at a pre-determined Service Level Specification.

The second physical device in the logical volume 160 covers the remaining 90 GB logical address space 164. It too is selected to satisfy the application demand. However, the address space 164 in the composite volume 160 for this example has far less access density. Therefore the I/O requirement is satisfied by a hardware RAID device configured as interleaved parity (RAID-5) having a small stripe unit and a relatively small stripe width. Thus, this second physical device requires fewer disk drive resources.

The operations involved in allocating physical resources to logical addresses and generating composite volumes may be performed by the system S and/or by an administrator. For example, an administrator may use a utility such as vxmake to rebuild volumes in the system. Here, the administrator may shut down the applications, copy data from one device to another, then change the address maps or other information that accomplishes this purpose so that the application accesses the data from new device.

In addition, the system may be configured to automatically reallocate resources based on, for example, the result of the I/O analysis and service level specification. Thus, the system may initiate operations to copy resources to a different set of devices, then reconfigure the file system maps or other information to redirect I/O to the new device. This may be accomplished when applications are executing, for example, by locking down the memory page structures, thereby forcing the application to, in effect, sleep while the change is made.

In contrast with conventional practice, the system of FIG. 1 does not spread the logical address space of the RAID volume consistently over the physical resource according to the RAID parameters. Instead, the system combines intimate knowledge of the application I/O behavior, with the RAID configuration process, to construct a logical to physical mapping that optimizes the application I/O. This optimization, unlike conventional practice, is sensitive to how the application I/O behavior varies over the logical address space.

Unlike conventional storage configuration, the system defines the I/O capability of the logical volume according to how the application uses it, breaking the logical address space into partitions, and concatenating physical resources together to match each logical address range to underlying physical resource. Implementation of this process is facilitated by the model for storage I/O capacity planning and the encapsulated storage file system discussed below. These facilities may be used to provide knowledge of application specific I/O demand relative to logical address space of the application. From this knowledge the design of composite volumes, satisfying the needs of specific regions of the application logical address space may be realized.

Figure 4:
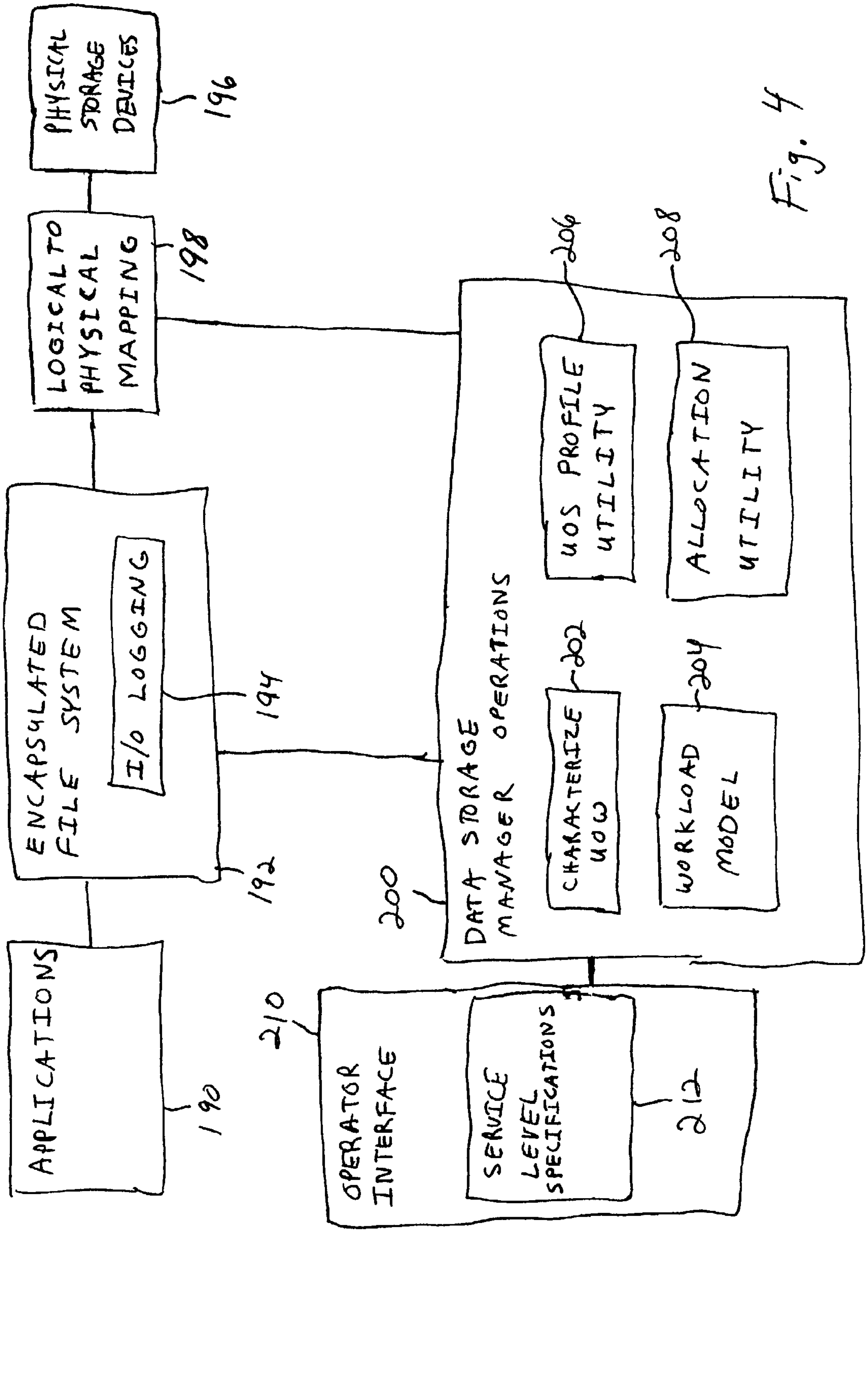
FIG. 4 is a block diagram of one embodiment of a data storage system constructed in accordance with the invention.

FIG. 4 depicts one embodiment of a data storage system incorporating an encapsulate file system and a workload model planning system constructed according to the invention. In FIG. 4 applications 190 access physical storage resources (e.g., devices 196) via an encapsulated file system 192. The encapsulated file system 192 performs traditional file system operations such as routing application I/O requests to mounted devices. This may include using logical to physical mapping 198 which may represent a logical device as the file system mount device. The layout of the logical device defines the logical to physical address mapping to access the physical storage devices 196.

The file system is encapsulated in that the traditional file system has been modified or designed so that I/O activity passing through the file system may be monitored and logged by an I/O logging component 194. Preferably, this is accomplished with minimal impact on the I/O activity. The encapsulated file system 192 operates in conjunction with operations performed by a data storage manager 200 to characterize the I/O and configure the system.

Several important components of the data storage manager operations are depicted in FIG. 4. A workload model component 204 performs data storage I/O capacity analysis and planning. A unit-of-storage ("UOS") profile utility 206 analyzes the performance (e.g., response times) of the physical storage devices 196 for different workloads (e.g., types of I/O accesses). For a given application workload, a characterize unit-of-work ("UOW") component 202 characterizes the performance of a given application workload. In addition, a operator may specify desired service level specifications 212 via an operator interface 210. Based on input from the components 202 and 206 and a desired service level specification 212, the workload model 204 selects appropriate physical storage resource devices 196 for the application I/O demand. Accordingly, an allocation utility 208 allocates physical storage devices to logical address by, for example, modifying the logical to physical mapping 198.

Figure 5:
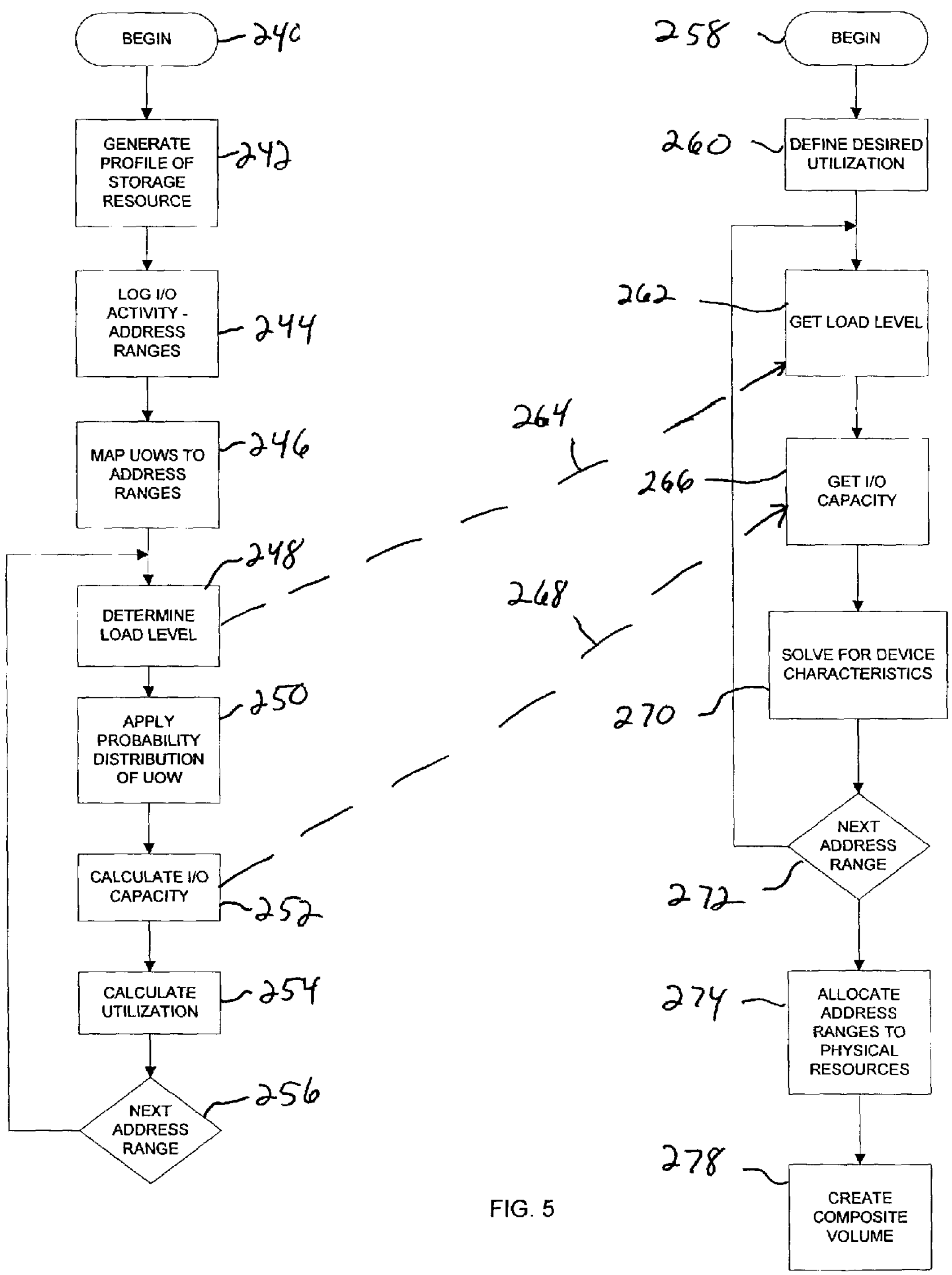
FIG. 5 is a flowchart representative of one embodiment of operations that may be performed in accordance with the embodiment of FIG. 4.

Additional details of operations that may be performed by the system of FIG. 4 will be discussed in conjunction with the flowchart of FIG. 5. Blocks 240–256 relate to operations for analyzing response times for complex workloads associated with a data storage resource (e.g., data storage device 196). Blocks 258–278 relate to operations for configuring system resources in response to calculated response times and/or utilization levels.

Referring now to the first set of blocks beginning at block 240, as represented by block 242, the UOS profile utility 206 analyzes the data storage resource 196 to determine the response characteristics (e.g., response times) of the data storage resource for various workloads. For example, data may be collected over time to determine, on average, how long it takes to complete requests for various data access types such as 8K random reads, 8K sequential writes, etc.

This analysis also may take into account the load level in the system. That is, data may be collected to determine the response characteristics as the number of concurrent requests varies.

As represented by block 244, the I/O logging component 194 generates a log of I/O activity in the system. As discussed above this log may include information that identifies the application that generated the I/O activity, the type of I/O activity and the logical addresses (e.g., address ranges) being accessed by the I/O activity. This information may take the form of a histogram that records the number of accesses between two or more addresses (e.g., address ranges). In addition, the system may be configured to track I/O accesses to physical addresses rather than logical addresses.

Next, as represented by block 246 the component 202 that characterizes each UOW identifies UOWs associated with the address ranges referred to in conjunction with block 244. The characteristics and other details of the UOWs are discussed in more detail below.

The next steps in the flowchart relate to determining the response time for a particular workload under a given set of conditions. This analysis may be performed for each application, for any type of UOW and/or for any address range. Thus, to fully characterize the performance in a given system, this process may be performed for each aspect of the system that is of interest.

As represented by block 248, the workload model 204 determines the load level (e.g., average number of concurrent operations) for the analysis. Typically, this is an empirical measurement of the load level in the system. Alternatively, the load level may be selected if, for example, the system is being configured to provide a certain level of performance at that load level.

As represented by block 250, the workload model 204 determines the complex probability distribution of the application workload. For example, this may indicate, on average, the percent of the concurrent I/O requests associated with a given workload. To illustrate further, 8K random reads and 8K random writes may, on average, each consume 50% of the I/O capacity of the data storage resource.

As represented by block 252, the workload model 204 calculates the I/O capacity of the data storage resource 196 for a given workload. For example, the average arrival rate for 8K random reads on a data storage resource under these conditions may be 100 I/O operations per second ("IOPS").

As represented by block 254, the workload model 204 calculates the utilization level of the data storage resource 196. The utilization level is a measure of percent of I/O capacity that is being used. It may be calculated, for example, by dividing a measured average IOPS by the estimated IOPS capacity of the data storage resource (calculated at block 252).

Finally, as represented by block 254, the above process is repeated for the other address ranges or any other aspect of the system that is of interest.

Turning now to the second set of blocks beginning with block 258, operations for configuring system resources will be discussed. Given a desired system response as described in blocks 240–256, an administrator may wish to determine the RAID stripe width he/she needs to maintain a desired utilization level (one example of a service level specification). As represented by block 260, the administrator defines a desired utilization level and sends this to the data storage manager 200 via an operator interface 210.

The next set of operations may be performed for each application, for any type of UOW and/or for any address range.

As represented by block 262, the data storage manager 200 determines the load level in the system. As represented by the dashed line 264, this may be one of the load levels determined at block 248. Alternatively, the load level may be specified at this step.

As represented by block 266, the data storage manager 200 determines the I/O capacity of the data storage resource 196. As represented by the dashed line 268, this may be one of the I/O capacities determined at block 252 As represented by block 270, the data storage manager 200 solves for the storage device characteristics. This may involve, for example calculating a desired parameter such as the stripe width necessary to provide a given utilization level. This also may involve identifying different types of physical storage devices (e.g., solid state devices and RAID devices) for different address ranges.

In some circumstances it is possible that a given system may not provide the desired level of performance. In this case, the data storage manager 200 may notify the administrator that the system may need to be reconfigured. For example, new data storage resources may be added or the data storage resources 196 may be replaced with different data storage resources. In one embodiment, the data storage manager 200 may automatically reconfigure the system.

In either case, the allocation utility 208 allocates physical resources to the logical address ranges (block 274) as discussed above and creates composite volumes, as necessary (block 278).

In an alternate embodiment, a process similar to that of blocks 258–278 may be used to solve for the load level in the system. For example, given a desired utilization level and data storage resource 196, the data storage manager 118 may determine the number of concurrent streams necessary to support the desired performance. This embodiment may be useful in applications where the applications may be tuned for a higher level of concurrency.

With the above overview in mind, additional details of several embodiments of the encapsulated file system, operator interface, the process of mapping demand to capacity and implementations of the components of the systems will be discussed.

Encapsulated Storage File System

Figure 6:
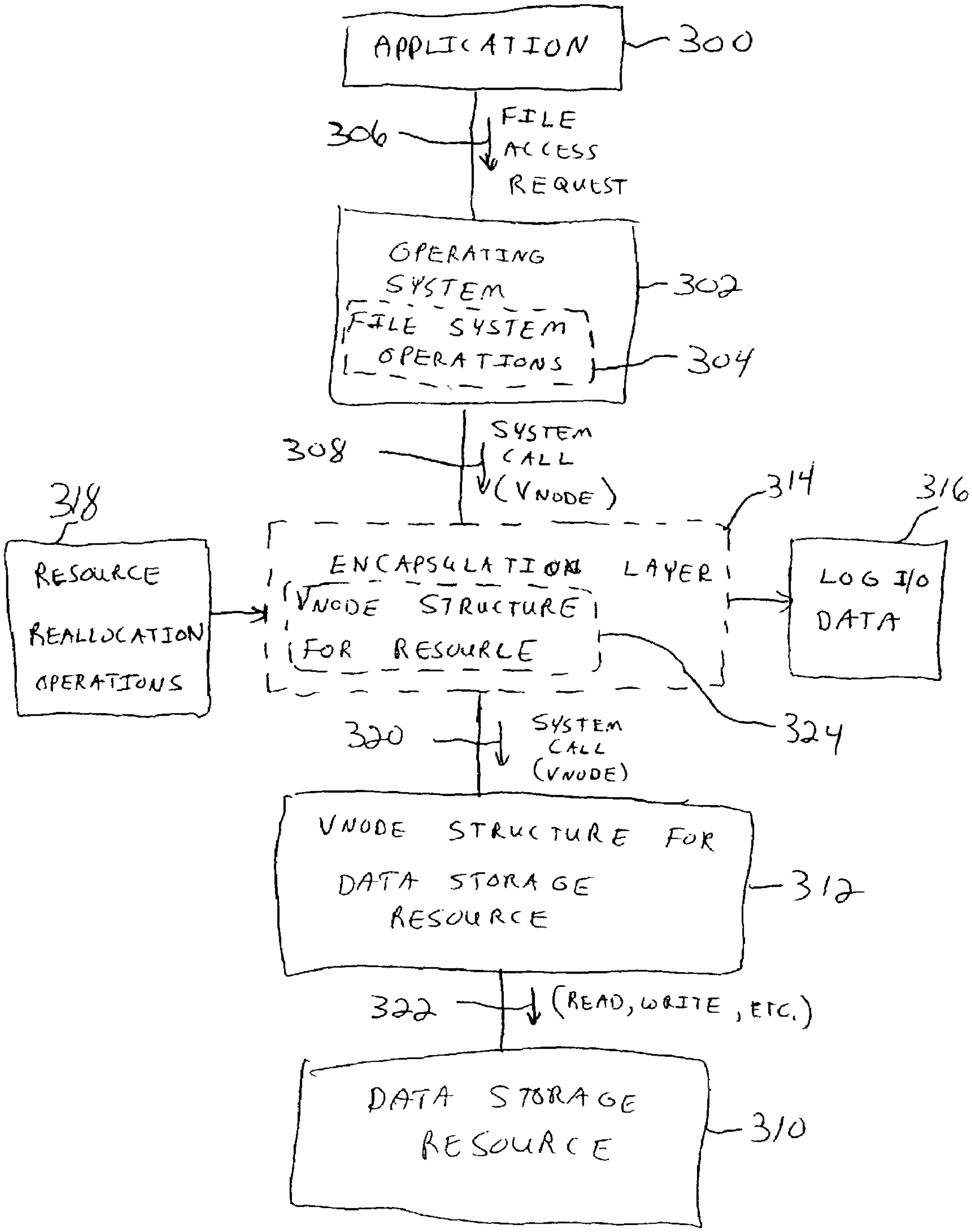
FIG. 6 is a conceptual block diagram of one embodiment of an encapsulated file system constructed in accordance with the invention.
Figure 7:
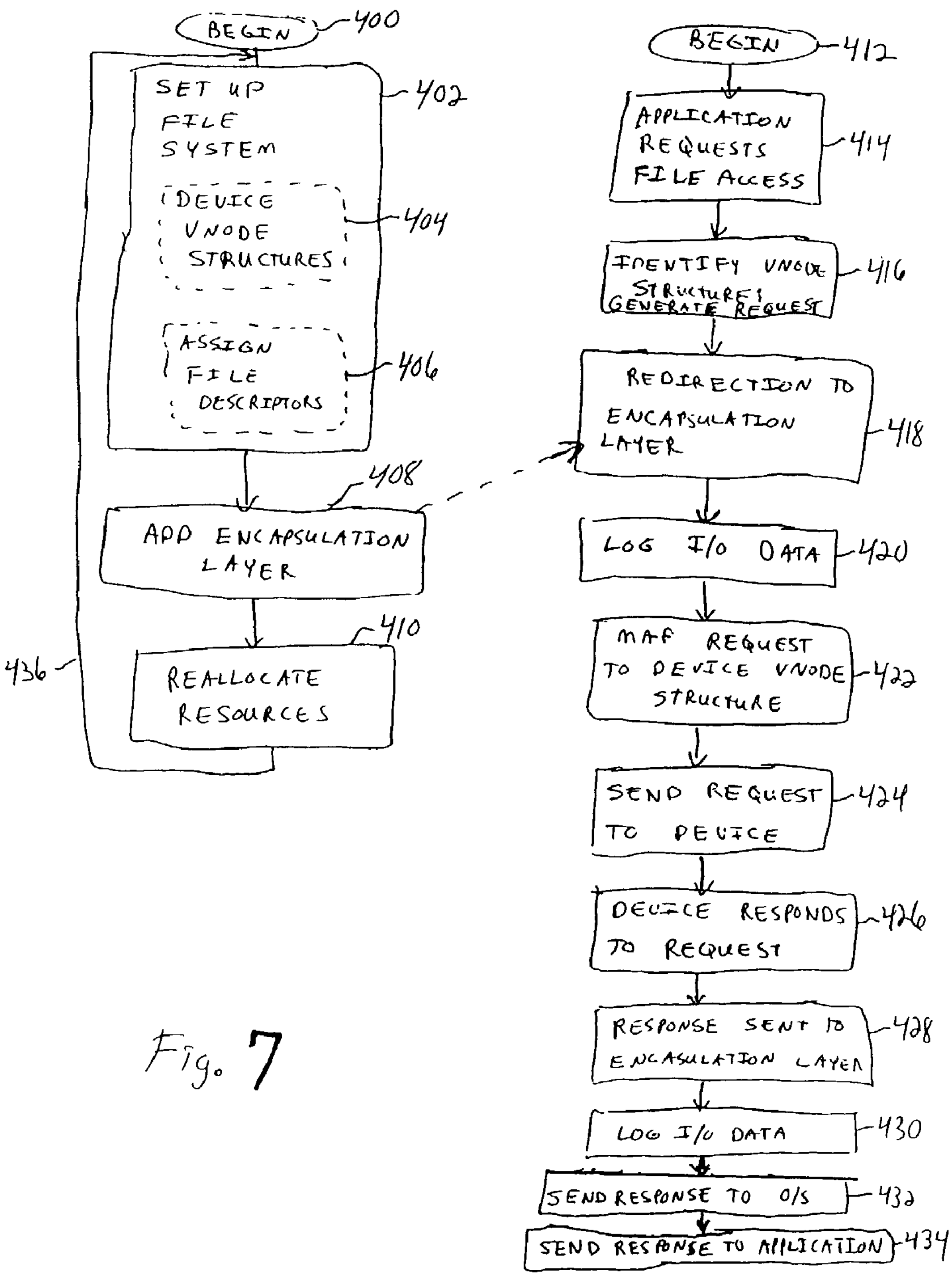
FIG. 7 is a flowchart representative of one embodiment of operations that may be performed in accordance with the embodiment of FIG. 6.
Figure 8:
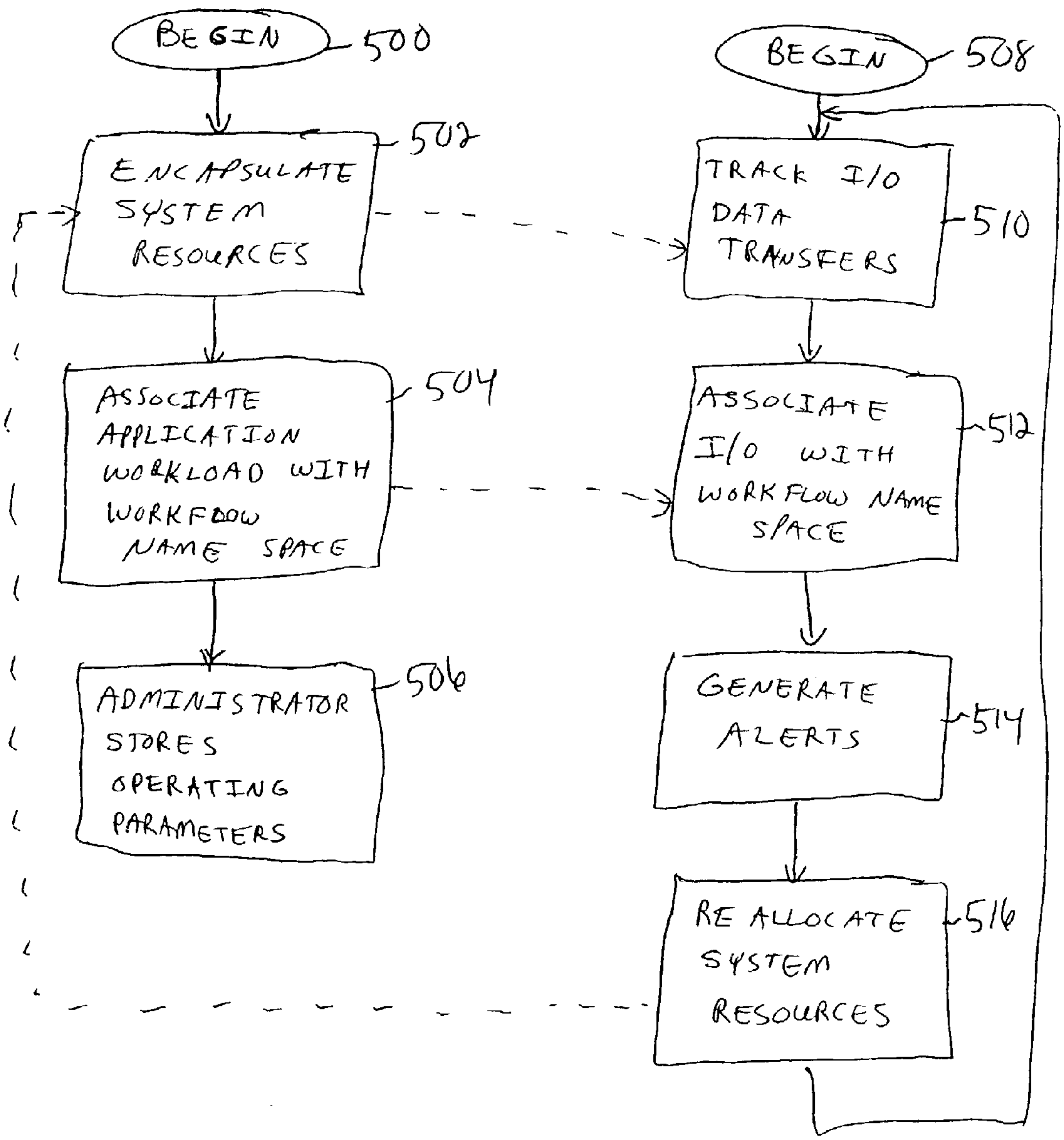
FIG. 8 is a flowchart representative of one embodiment of user interface operations that may be performed in accordance with the invention.

Referring now to FIGS. 6 through 8, one embodiment of an encapsulated storage file system ("ESFS") will be discussed in more detail. This embodiment relates to the interposition of a user and application transparent layer between the application and real file system or raw device. For example, a user interface and associated storage management application may be integrated into the file system of an operating system. From this position in the operating system kernel, the management application may be seamlessly integrated into existing environments, real-time analysis of application behavior may be tracked, and first tier control of system resources for mapping to the application logical address space may be obtained.

The embodiments of FIGS. 6 and 7 relate to the UNIX abstraction of the Vnode/Vfs interface. The file system, and in particular the UNIX abstraction of the Vnode/Vfs interface, provides a favorable vantage point for the implementation of a comprehensive storage management solution. All storage resources are presented to the application through the file system and, in this sense, all I/O passes through the file system in the form of accesses to regular files or raw (device) files. The file system may control the mapping of virtual memory to devices, and may have access to the device resources available to the host system, even if those devices have not been integrated into the user accessible device tree. The position of the file system, in the kernel, with full access to kernel resources, located between the user application and the storage resource may provide a preferable implementation location for storage management.

Moreover, the benefits of the file system may be obtained without incurring all the complexity of a full file system implementation. These benefits may be obtained, for example, by interposition and encapsulation of existing file systems and raw devices with a simple layer between the user and the real file system. This approach has all the advantages, and a minimum of the complexity, characteristic of this layer of the operating system.

In FIG. 6 an operating system 302 controls execution of application programs 300. In addition, file system operations 304 in the operating system handle requests 306 for data storage resources in the system. For example, requests to open, read, write and seek a file are handled by the file system 304.

In accordance with one embodiment of the invention, the system calls 308 from the operating system 302 that would normally be passed to routines associated with a data storage resource 310 are instead redirected to a data storage management application. The data storage management application transparently routes the I/O request to the routines associated with the data storage resource. However, the data storage management application may also log the details of the I/O requests and the system I/O performance associated with the I/O requests. In addition, the data storage management application may allocate different data storage resources to the application to achieve system performance objectives.

The operation of the system of FIG. 6 will be described in more detail in conjunction with the flowchart of FIG. 7. The operations represented by blocks 400–410 relate to operations that may be performed to configure an encapsulated file system.

As represented by block 402, an administrator initially sets up the operating system and associated file system. In addition, when a user accesses or opens a file the operating system defines virtual node ("VNODE") structures (block 404) and file descriptors (block 406) associated with the file.

As represented by block 408, a data storage management application is incorporated into the system. In one embodiment, this may be implemented with a transparent encapsulation layer process 314 that intercepts, processes and/or monitors system calls from the file system 304 to data storage resources 310. In one embodiment, system calls associated with the VNODE structure 312 of a data storage resource 310 are mapped to an alternative VNODE structure 324 associated with the encapsulation layer 314. After processing the system call, the encapsulation layer redirects the system call (as represented by line 320) to the VNODE structure 312. Thus, the encapsulation may be transparent in the sense that the system call may, in effect, be routed to the data storage resource without modification.

In addition, as represented by block 410, the data storage management application may perform reallocation operations 318 that reallocate system resources. For example, I/O requests for a given application may be redirected to a different data storage resource. As represented by line 436, this may require reconfiguration at the operating system level.

The operations represented by blocks 412–434 relate to operations that may be performed when the encapsulated file system services I/O requests. As represented by block 414, the application 300 issues a file access request 306 (e.g., system call) that is handled by the file system 304. Typically this request would include a file descriptor that uniquely identifies the desired data resource. Next, the operating system 302 accesses a system file table to determine the VNODE associated with the request (e.g., associated with the file descriptor) and invokes the VNODE operation associated with the system call 308 (block 416). Conventionally, the system call 308 would invoke an operation defined by the VNODE structure 312 for the data storage resource 310.

In accordance with this embodiment of the invention, however, the system call instead invokes an operation defined by the VNODE structure 324 for the encapsulation layer 314 defined at block 408. Thus, the system call 308 is effectively redirected to the encapsulation layer (block 418). The encapsulation layer process monitors I/O information associated with the request and stores the information in a data memory 316 as represented by block 420.

Next, the encapsulation layer 314 invokes the originally intended VNODE operation corresponding to the system call 308. This VNODE operation is associated with the VNODE structure 312 for the data storage resource 310 (block 422).

As a result, the routine specified in the VNODE structure 312 is called and, as represented by block 424, this routine generates a request 322 (e.g., a read or write operation) to the data storage resource 310.

The response of the data storage resource 310 to the request (block 426) is routed back to the operational components discussed above in a manner complementary to the request operations. Thus, the response also may be handled by the encapsulation layer 314 (block 428). In this way, the encapsulation layer 314 may again log information related to the I/O request (block 430).

As represented by blocks 432 and 434, the request is then sent back, in a transparent manner, via the file system 304 to the application 300.

Referring now to FIG. 8, one embodiment of user interface operations performed according to the invention will be discussed. A primary function of the user interface is to associate data storage resources with applications and user policies (e.g., a service level specification as discussed below).

The operations represented by blocks 500–506 relate to operations that may be performed to configure the user interface in an encapsulated file system. As represented by block 502, the user interface may operate in conjunction with encapsulated system resources, for example, as discussed herein.

In addition, as represented by block 504, the user interface may operate in conjunction with a workflow name space. For example, as discussed herein, the workflow name space may be associated with the workload of an application. In this way, workload in a system may be traced to the business processes that use the workload.

As represented by block 506, the user interface enables an administrator to define system parameters. Examples of these parameters are discussed below.

The operations represented by blocks 508–516 relate to real-time user interface operations. As represented by block 510, the encapsulated storage file system may track I/O activity in the system. In addition, this information may be stored in a data memory.

As represented by block 512, this I/O activity may be associated with the workflow name space defined at block 504. Thus, the user interface may track resource use by each application and provide information regarding the comparative use of system resources by each application Instrumentation of the workload through the encapsulated storage file system ("ESFS") provides a means of workload characterization. For example, when utilization levels approach threshold values in the system, the system may notify the administrator. Thus, the user interface may be configured to generate alerts based on operating parameters (block 514).

As represented by block 516, an administrator may use the user interface to reallocate system resources. The user interface may leverage and integrate the storage management tools and capabilities described herein. In particular, it may control the functional analysis applications that measure and respond to application demand and resource capacity. Thus, the system may be configured to request user input as simple as: "how much head room do you desire?" In this case, the system may specify, build and maintain the storage resource to satisfy the application, business requirements and customer objectives.

Conventional user interfaces may include a file system browser with MIME capabilities to associate plug-in capability, extensible processing of file system objects based on file name extensions, such as ".html" for a WEB page. Similarly, the user interface described herein may present a file system to an administrator for organizing and managing resource allocation. Accordingly, with the use of file extensions and plug in capability, within the workflow name space, a standard WEB browser, traversing the workflow name space may be adapted to provide a user interface in accordance with this embodiment of the invention.

Workflow Name Space

Figure 9:
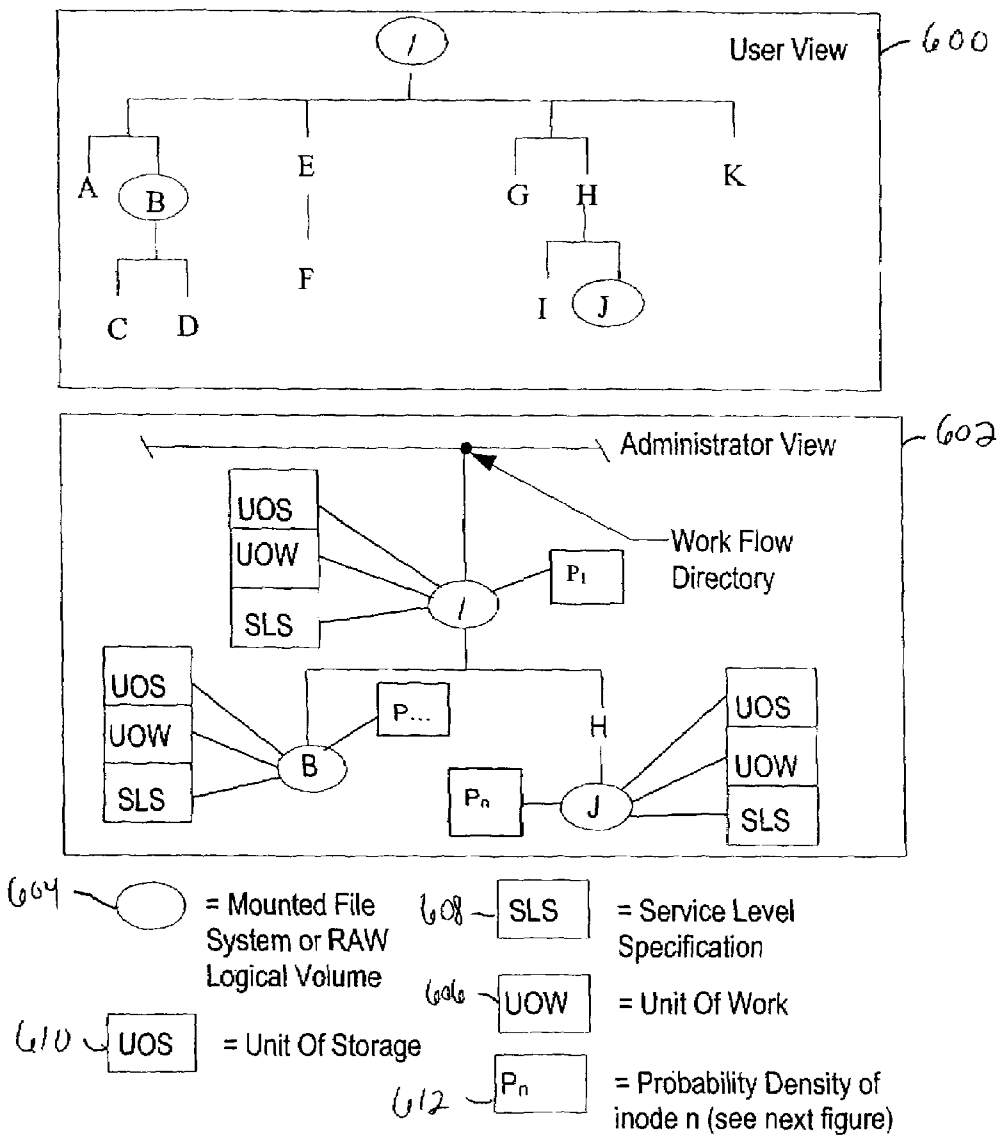
FIG. 9 is a graphical representation of one embodiment of a workflow name space in accordance with the invention.
Figure 10:
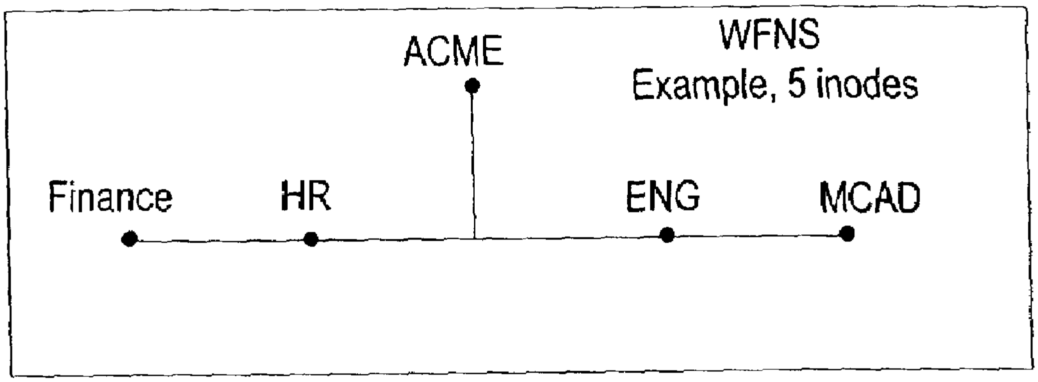
FIG. 10 is a graphical representation of one embodiment of a workflow name space in accordance with the invention.

Referring now to FIGS. 9 and 10, one embodiment of a workflow name space ("WFNS") according to the invention will be discussed. The workflow name space associates enterprise resources through the ESFS. For example, it may provide a level of abstraction between what a database calls a storage resource and what the operating environment calls the storage resource. This approach is in contrast to conventional naming conventions, where storage resource is allocated in terms of operating system, volume management, switch, network and other sub-system dependent naming conventions such as: "/devices/sbus@1f,0/SUNW,fas@e,8800000/sd@4,0:a,raw," an example of a Solaris name for a SCSI device.

The workflow name space allows customers to allocate resources and monitor resource utilization through a naming convention that reflects the company organization, for example, along departmental boundaries. For example, the ESFS administrative WFNS provides an empirical audit trail of resource usage by business process name. Thus, a business process may be associated with an application and the I/O activity associated with that application.

By associating storage resources with the business processes that consume them, the real requirement of a business process may be better understood as it evolves through the business cycle. Thus, quantifiable improvements in the forecasting of capital investment requirements may be made thereby improving profitability by avoiding under or over purchasing of resources and by preventing resource shortages.

FIG. 9 depicts two views of a file system. The user view 600 represents the hierarchical structure typically seen by a user. This view may include logical file designations (e.g., directory C). The administrator view 602 focuses on the physical resources of the file system such as a mounted file system 604.

In one embodiment, the ESFS workflow name space is a virtual file system implemented in a network-distributed database. This embodiment is similar to NFS in that the backing store for memory occupied by an ESFS (in core) index node (POSIX Inode), the Unix VFS Vnode, is a network-based service. With NFS, a remote machine exports a file system with a set of methods for accessing the remote files, the NFS protocol. In this embodiment, however, the workflow name space is associated with methods for managing application storage resources.

The system incorporates a network-based protocol for relating applications to the physical resources (e.g., mounted file systems 604) they utilize. It associates the primary data elements, UOW 606, SLS 608, UOS 610, and probability density ($P_n$) 612, to an Inode. A WFNS name provides the primary key for the tracking of workload and resources by business process name. It ties together all the sub-systems described herein to solve the business problem of allocating optimal storage resources, and tracking resource allocation and utilization relative to the rest of a project, department, and company.

The meaning of the workflow name space directory tree, as seen by an administrator, mounting and traversing the ESFS file system, is the one-created by the administrator, to their own liking and/or according to company policies. See, for example, the workflow name space of FIG. 10.

The system may provide an advantageous device name abstraction, and associated utilities, by managing the size and I/O capacity of logical devices in use by the application. Instead of the administrator building a logical volume and placing a symbolic link in a database directory for use by the RDBMS, the administrator may create the logical name directly under the path name by which it is used, as a managed resource under ESFS. Likewise the system may manage a user's file system performance by offloading hot directory sub-trees to additional supporting storage resources, transparent to the user's view and use of the file system. The system may manage the creation of in-line device files for the encapsulated file system and manage mount points in the /etc/vfstab file of the client machine using encapsulated file systems and logical volumes.

In addition, the system may specify and/or build host logical volumes from a pool of storage resources made available to the workflow name, along with file system and operating environment settings to achieve the SLS associated with the business object name.

The system also may provide an enterprise wide name service. Any location in the world where physical connectivity may be made, is a candidate to have direct access to a storage resource, and have it connected at the bandwidth required to service the remote application requesting the service. WAN and LAN capability may be supported. Administrators may authorize, authenticate, and otherwise secure the WFNS by domain. Here, the WFNS may be integrated with VPN, LDAP (nis, nis+, etc.), through the Distributed Data Services, to tie the system together under the administrative mount point of the ESFS file system.

Thus, with the workflow name space, access to storage resource by business object name may be made available anywhere in the enterprise for which there exists a physical infrastructure for the connection. This provides improved data availability, improves productivity and avoids the financial impact of down time associated with loss of availability to business applications.

Mapping Demand to Capacity

The process of mapping application demand to storage resource capacity discussed above will be treated in more detail in conjunction with FIGS. 11–14. The following describes the relationship of I/O workload demand to storage resource I/O capacity in terms of linear operators in Hilbert space and Fourier series, with reference to Conservation of Energy. These relationships are used to determine, based on empirical data, how well a given storage resource supports an application. To this end, this process involves performing empirical measurements of system resources over a spectrum of workload operations to create physically-based models.

The concepts of Unit of Work ("UOW"), Unit of Storage ("UOS") and Service Level Specification ("SLS") will be used in the following discussion of the data storage management system. A brief definition of one embodiment of each concept follows.

Unit of Work

A Unit Of Work is defined as the set:

{N, I/O Size, Access Type, Range, Probability Density}

N is the load level metric. It is equal to the number of requests in queue plus the number of requests in service. N is the independent variable in this model; all response times are an implicit function of this variable. It has a probability distribution of it's own, used in the SLS to establish target performance goals. The same N probability distribution or point estimate applies to all UOW in a complex combination.

I/O Size is the number of bytes transferred in a single I/O operation.

Access Type is a unique combination of {read, write} and {sequential, random} with four possible combinations {RR, RW, SR, SW}.

Range is a measure of the I/O address range size. In one conservative embodiment this is set to the full seek range of the device.

Probability Density is a measure of the relative frequency of occurrence, the limiting probability of the UOW. It defines the contribution of each UOW based on one and the same N distribution as discussed above. There may be advantages related to exploiting probability density (normalized access density) to optimize the co-location of data on shared resources.

Unit of Storage

A Unit Of Storage is defined as the set:

{Hardware, RAID Level, Stripe Width, Stripe Unit}

Hardware is a logical or physical storage device that, along with the characteristics and number of I/O Buses and HBAs used to connect it, defines a basis for performance expectation given the other soft configurable parameters in the UOS set.

RAID Level (soft configuration parameter) is typically 0,1 or 5, with possible combination and layering, such as 1+0 for stripped mirrors, or for instance, 0 over 5, "plaiding", where a RAID-0 stripe at the host level is used to combine multiple RAID-5 LUNS from an underlying hardware RAID controller.

Stripe Width (soft configuration parameter) the (effective) number of data drives in the device. For a RAID-5 device, the total number of drives is effectively N+1 where N is the stripe width. In RAID-1 (or 1+0, 0+1), there are always N+N total drives, where again, N is the stripe width. This may be the single most important parameter defining the maximum I/O capacity of rotating disk media.

Stripe Unit (soft configuration parameter) is the amount of data that goes on one data drive before moving to the next data drive in a stripe. The stripe unit determines the frequency of rotation across the members of the RAID device relative to the logically contiguous addresses. It is important for defining the relationship between I/O size and number of physical disks handling a single I/O.

Service Level Specification

A Service Level Specification is defined as the set:

{Name, Percentile Range, Utilization}

Name is an ESFS workflow name, associated with a business object directory or physical resource file system and/or raw device of the ESFS workflow name space.

Figure 11:
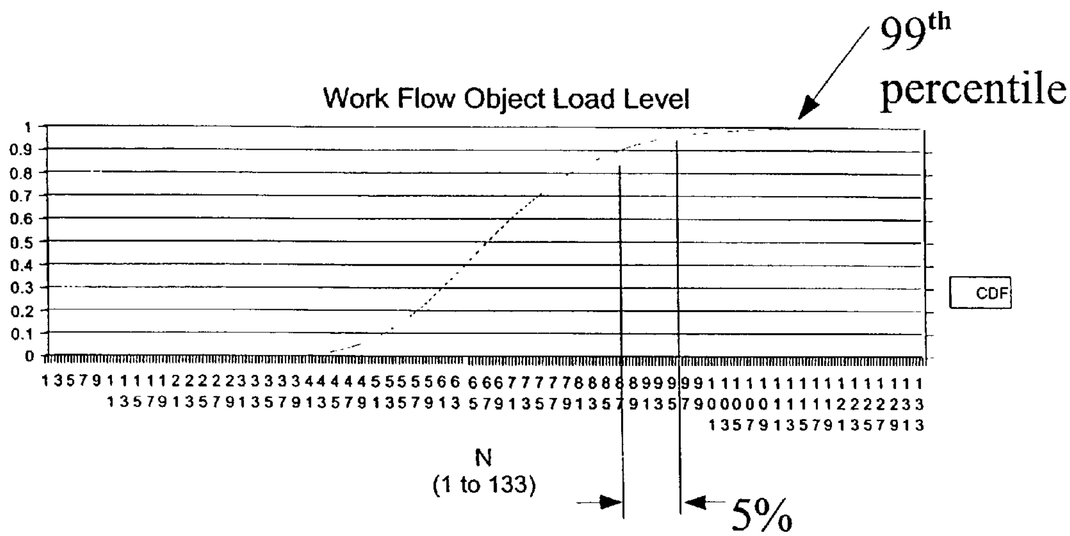
FIG. 11 is a graphical representation of one embodiment of a workflow object load level in accordance with the invention.

Percentile Range is the cumulative distribution interval for which it is asserted that the corresponding portion of the workload is less than or equal to the total probability area of the interval. For example, a value of 0.0–0.95 means that 95% of the workload, from no load level to 95% of the highest load level, will incur response time and Utilization less than or equal to the values indicated by the Utilization and Response elements of the SLS. A value of 0.90–0.95 (as illustrated in FIG. 11) indicates that the upper 5% of load level with be satisfied at less than or equal to the SLS Utilization and Response time.

Utilization is the context dependent I/O capacity of the allocated storage resource, relative to the arrival rate of requests to the workflow object. For example, for a workflow object arrival rate of 1500 IOPS, and a context dependent I/O capacity of 3000 IOPS, the Utilization is 0.5 or 50%.

Process of Mapping Demand to Capacity

To manage the I/O capacity of a storage resource (IOPS at a given response time and/or bandwidth in terms of MBits/second), the complex demand on the storage resource and the specific demand of the applications may be taken into account. From this information an estimate of the I/O capacity available to applications sharing the resource and the utilization level of the resource may be obtained.

It is important to operate a storage resource in its normal operating range, and not saturate or over utilize the device. There is always a context sensitive limit to what any device can support in terms of throughput; however, there is no limit to the response time that may be incurred by an overloaded device. Once the-saturation point of throughput is reached, response times increases proportional to load level without bound. This is the infamous "knee of the curve" which may be determined if the precise, context sensitive, I/O capacity of the storage resource, and thus, the context sensitive utilization of that resource is determined.

The context of I/O capacity is the complex combination of I/O workload characteristics under linear transformation by the storage resource. All possible results of an I/O workload meets a storage resource may be closely approximated by a linear combination of the specific workload characteristic magnitudes, with the response time gradient of the storage resource relative to those specific workload characteristics. The following examples provide techniques for mapping capacity to demand, based on real time knowledge of the application workload and a library of storage resource performance profiles.

To make efficient and deterministic use of enterprise storage resources, not only must the connectivity issues and the myriad of naming abstractions be managed, but also, a rigorous definition of both the application I/O demand and the resource I/O capacity is required. As stated above, the I/O capacity of a given physical resource depends on the context of the complex combination of application I/O demand. For instance, 11 streams of 2 kilobyte random write is very different than 1 stream of 1 megabyte sequential read, and the combination of these two may be different than either one alone. In practice, the portion and effect of each component in a complex workload combination may be summarized and represented by marginal probability distributions and linear combinations of the components they represent. Marginal probability distributions are, by definition, the limit of relative frequencies. These limits are the portions, or "Fraction Enhanced", in Amdahl's law, and along with Littles Law, and elementary Functional Analysis, provide a means of describing the workload in manageable units of I/O demand, and the storage resource in manageable units of I/O capacity.

For a given intersection of a UOW and UOS (notation UOW∩UOS), the methodology that follows empirically defines a response time differential dR with respect to load level N. The derivative dR/dN, is used to estimate response time for a given UOW∩UOS with N, the load level, as an independent variable. The result is weighted by the probability density of the UOW. The differential of response time is dR=m dN where m is the slope of the response time function for a given UOW∩UOS. An initial condition of response time is provided by the empirical measurement, and together with the measured derivative of response time, and probability density of the UOW, provides the analytical basis for modeling complex response time.

An arbitrary number of slopes, each representing a UOW∩UOS, weighted by access density probability, defines the complex workload response time slope, and thus, the limit of I/O capacity for the given combination, and the estimated response time for a given load level. This model is essentially a Fourier series decomposition of response time, and topologically, a closed linear manifold.

Given a complex response time slope m, the theoretical limit of I/Os per second X (IOPS) is 1/m. This limit represents the context dependent maximum capacity of the I/O subsystem for the given complex combination of workload. The expectation at a given load level, up to this limit, and the Arrival Rate of I/O into the system, as a ratio of this expectation, expresses the context dependent utilization of the UOS.

$$R=mN+S \qquad \text{EQUATION 1}$$

The relationship between N, X and R, is defined by Littles Law:

$$N=XR \qquad \text{EQUATION 2}$$

N is load level as defined for a UOW

X is throughput in I/O completions per second

R is the response time for one completion

Given a load level N, and a response time R, both functions of the UOW∩UOS, I/O capacity may be estimated as X=N/R. Utilization is defined as U=(Arrival Rate/X).

Figure 12:
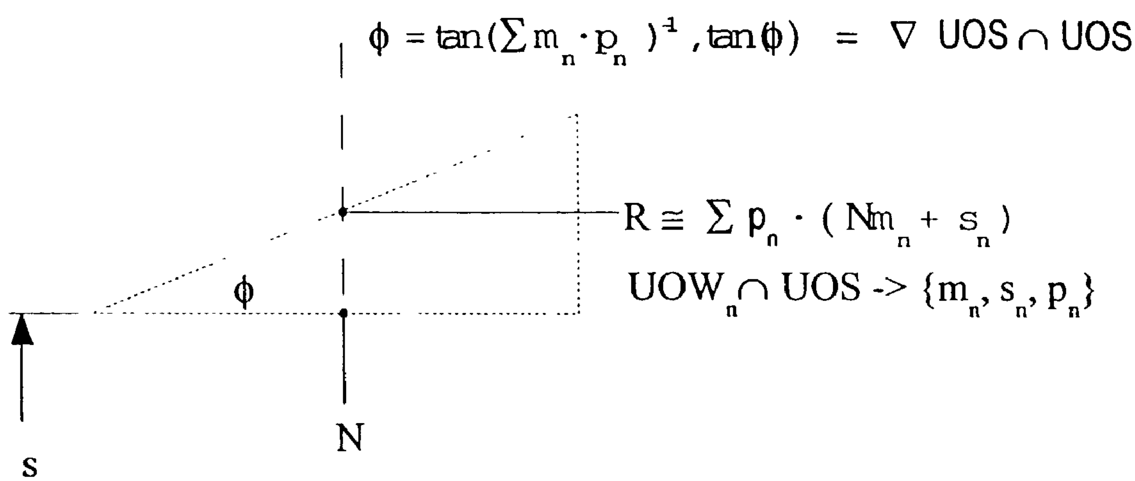
FIG. 12 is a graphical representation of one embodiment of a mapping of a unit of work to a unit of storage in accordance with the invention.

In a complex combination of n UOW with $\Sigma\ p_n=1$, $\Sigma\ p_n \cdot R_n \approx R$ and, and the expectation of X≈N/R. In this case the probability density coefficients are applied to the individual $UOW_n$∩UOS response times, and the result divided into N to define the expectation of X. FIG. 12 illustrates a mathematical model of workload response time.

Amdahls Law defines total performance differential based on the decomposition of the workload into components, and the fraction of time spent in each component. It accesses the impact a differential in performance of the component has on the whole. Intuitively, if the workload spends zero time in a component, then making that component infinitely faster has zero impact on performance, conversely, if a workload exclusively uses a particular component, then all incremental improvement in that component is reflected in the workload as a whole. The performance differential is expressed as a Speedup, as in, 2 times faster, or 5 times faster; a number greater than 1. In practice a workload is supported by various components, and spends some fraction of its total time in each. Amdahls law is:

Performance Improvement=((1−Fraction Enhanced)+(Fraction Enhanced/SpeedUP)) EQUATION 3

Figure 13:
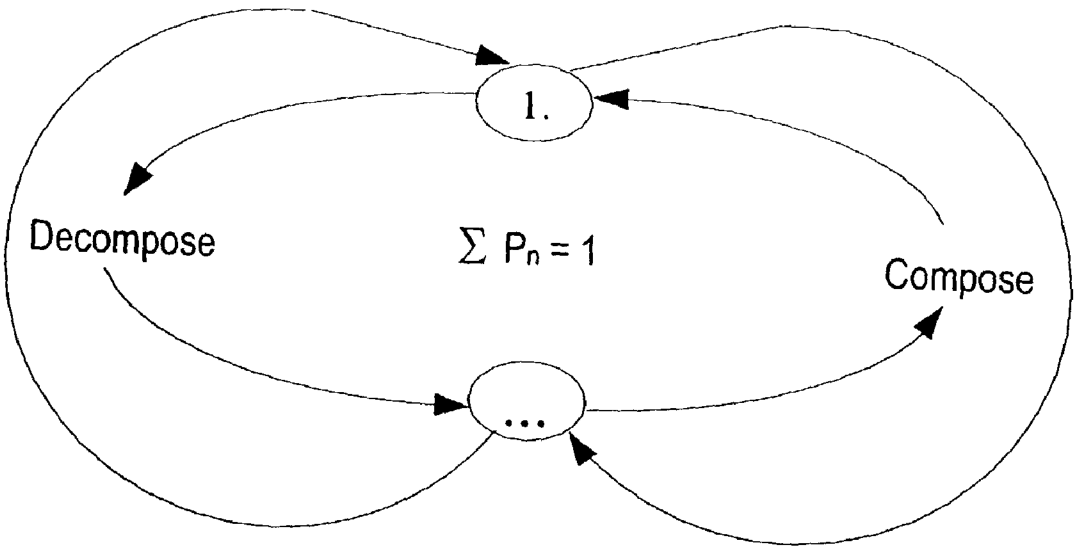
FIG. 13 is a graphical representation of one embodiment of a mapping of probability composition/decomposition in accordance with the invention.
Figure 14:
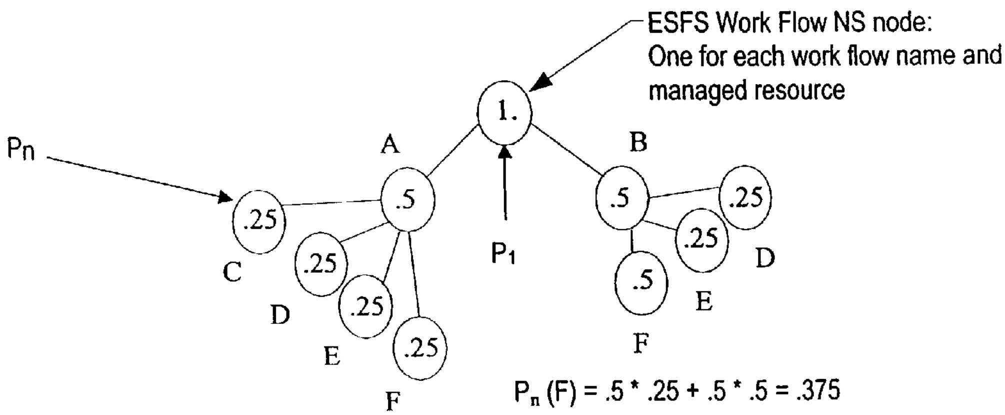
FIG. 14 is a graphical representation of one embodiment of a mapping of a probability distribution in accordance with the invention.

Amdahls law, can be applied recursively to any system or sub-system that can itself be partitioned into a collection of components. As represented by FIG. 13, the fractions that partition a system must always sum to 1, and all fractions are a number between 0 and 1 inclusive. These are the properties of a probability distribution, and are equivalent to the decomposition of total probability into conditional and marginal probabilities. The components of a workload so described lend themselves naturally to a probability measure space.

The above definition of UOW and UOS includes a time independent model based on the limit of relative frequency. This is consistent with the fact that I/O involves random events, which by definition, do not depend on time, only the size of a given time interval. A model of this type is referred to as a stochastic process.

The model is based on a linear operator that is a gradient in vector calculus, topologically a differential manifold, and in general, the surface integral of a vector function over a field. The system satisfies Laplace's equation and is thus a Harmonic Function in N−1 variables. The N−1 variables reflect the isomorphism between the Polynomial s of N−1 degree, and Euclidean Real space in N dimensions. A system of first order linear differential equations is isomorphic to an nth order differential equation, is isomorphic to an N−1 degree polynomial. There is a spectrum of roots, the eigen values of the characteristic function of the operator, the gradient components in this case, which correspond to the coefficients of powers of the independent variable in the exponential series, which define the general solution of an nth order linear differential equation with constant coefficients. Vector fields, linear transformations, and systems of differential equations are essentially the same. The complex response time expectation of a given UOW∩UOS may be represented as the intersection between a hyper sphere in n-dimensions (the gradient of response time for the UOW∩UOS) and a hyper plane in n-dimensions (the relative workload levels for the UOW∩UOS).

The curve thus formed corresponds to the expectation of complex response time for the UOW∩UOS. This is then used with Littles law, Amdahl's law, and subject to arbitrary n-dimensional convolution of empirical probability densities, to provide a measure space of expectation of throughput, response time, and utilization.

Stated differently, integration of the projected surface of an analytic function over a differential field onto the complex plane, with convolution of probability density provides an apparatus for defining the moments of response time for a specific UOW∩UOS, over the entire operating range of the storage sub-system. Complex response time differential corresponds to the inner product formed by two n-dimensional vectors, one component for each UOW probability density times Nfront (one for each dimension) and another vector whose components are the differential of response time with respect to load level in each dimension. The solution space is an orthogonal complement to the sub-space of relative workload levels. This is a proper Hilbert Space, it is an example of a complex trigonometric Fourier series.

There is one dimension for each UOW∩UOS of the workload in the fundamental system of equations representing expectation of complex response time for the storage resource allocated to the given application workload.

In the model, response time is a vector orthogonal to the linear manifold defined by a system of UOW∩UOS vectors. A system of load level vectors is transformed by the differential linear operator, in real time, consisting of a matrix with the UOW∩UOS gradient vector on the diagonal and zeros elsewhere and weighted by the UOW probabilities. The result value of the integral so obtained is the mathematical expectation of response time for a complex UOW∩UOS combination. Empirical boundary conditions are weighted by probability density of the UOW to define the constants of integration, one for each dimension.

These dynamically generated functions are used to predict the behavior of a complex physical system: The storage sub-system. The model provides for dynamic adjustment of the real time expectation based on updated profiles of the storage resource through subscription library services and dynamic update of relative workload levels, composition and utilization, through the facility of ESFS.

EXAMPLE

Application of the above operations will be further explained by way of an example. This example describes a workload model for response time expectation of a complex I/O workload applied to a given storage subsystem resource, and the inverse problem of determining the amount of a given storage resource required to satisfy the given workload at a predetermined response time. The first part of the model demonstrates UOW∩UOS≈SLS. The second part demonstrates UOW∩SLS≈UOS.

The mathematical expectation of workload response time was discussed above in conjunction with FIG. 12. This discussion treated the model as an example of linear operators in Hilbert space. Hilbert space is an n-dimensional Euclidean space, a metric space equipped with an inner product. An inner product is the cosine of the angle between two vectors in n-dimensional space multiplied by the absolute values of each of the two vector magnitudes (norms); it defines at any given point along one vector, the orthogonal distance to the other vector. A metric is a distance. Conceptually, and mathematically, in the model, response time is the distance between the workload and the storage resource in Hilbert space. Response time is a sub-space of Hilbert space, which is orthogonal to the UOW∩UOS linear manifold of probability and load level. The response time state vector is the Pythagorean theorem ($A^2+B^2=C^2$) generalized to n-dimensions. The cosine is the base; the sine is the rise of a triangle. The state vector of complex response projects onto each UOW axis a directional cosine, and associated with a cosine, is a sine. Each sine is the perpendicular distance (the shortest distance) between a UOW axis and the response time state vector. The differential of response time is the inner product between the weighted load level vector, and the storage resources differential operator of response time (a gradient vector) with a matching component for each component of the workload. They share the same dimensions, which is an isomorphism between them. Response time is approximated by the weighted sum of these sines, as defined by empirical data; the measured differential of response time with respect to load level with initial conditions for each fundamental UOW∩UOS. An arbitrary complex workload is thus represented by a linear combination, or superposition of a fundamental UOW∩UOS basis. The model is n-dimensional because it deals with functions of a single independent variable of which there are an infinite number. These functions define the mapping between a workload and a storage resource. Important functions are treated foremost, as defined by cumulative probability distribution, and as required to meet the desired level of precision in the approximation. The example of Hilbert space is called $L^2$, a square integralable space of continuous functions of bounded variation. Lebesgue measure of Sigma Fields and Borel Sets are the probability distributions. Linear operators of proportion modeled as probabilities, define the workload in this way. The probabilities are applied to first order harmonic linear differentials and initial conditions of response time, a Fourier series. Upon integration, response time is approximated by a single linear equation of the form R=Nm+s, in 2-dimensions: R and N. This single function results from the converging series of differentials, initial conditions and probabilities. The model is a particular example, and pragmatic application, of the above completely general concepts and topics of functional analysis, distribution theory, and mathematical physics.

There are three types of probability distributions in the model. The spectral analysis of a UOW defines a single UOW variable in n-dimensions, corresponding to one row in a UOW stochastic matrix (the rows sum to 1). The definition is analogous to a point in n-dimensional space with the restriction that the sum of coordinates for any one point is 1. The second type of probability distribution associates UOW points into scalar rings, which again sum to 1. Each row in a UOW probability matrix has an associated ring probability. The first type of probability distribution is a function of an application workload, the second kind, a function of the WFNS, and Amdahls law, applied to all applications in the WFNS, conserving energy and probability. When the ring probability is applied to the UOW probability, the result is a probability distribution, a matrix where the sum of all elements is 1. These are used to scale load level, in n-dimensions, in the approximation of response time. The third probability type is one or more probability distributions for various workload parameters of interest; first and most importantly, load level. Others of this type may include, for example, arrival rate and the number of concurrently active devices. Load level is the single independent variable of the model. Arrival rate is used to establish utilization.

The following examples are based on an example storage resource for which the differential of response time with respect to load level, and initial condition of response time, for a set of four fundamental UOW∩UOS combinations is defined. In practice, these metrics will come from the Storage Resource Profiler (SRP) component facility discussed below.

TABLE 1

| UOW∩UOS n = {1, 2, 3, 4} | $\partial R/\partial N = m_n$ | $IC = s_n$ |
|---|---|---|
| 1 | .0025 | .003 |
| 2 | .0035 | .004 |
| 3 | .0045 | .005 |
| 4 | .0055 | .006 |

Table 1 defines the fundamental basis for the examples that follow.

A complex workload is defined as a set of probabilities applied to each of the above, which represent for instance 8 KB RR, RW, SR, SW, for a given UOS hardware resource.

The above metrics may be obtained from measurement of the storage resource hardware. They need not depend on any workload. Hence, they may be an intrinsic feature of, and characterize the hardware.

A workload (e.g., an I/O workload) is defined by a set of limiting probabilities with regards to a given basis (as defined in the above table) and a load level probability distribution.

Load level in the model is defined as the number of I/O requests in the system, both in service and in queue, and an associated probability distribution.

The aggregate load level, across all devices of an application is called Nfront. This is in contrast to Ndd, or load level per data drive (which can be generalized to a storage resource unit), Ndd=Nfront/UOS→stripe_width.

In practice, Nfront generally has a Poisson distribution, as the probability of a given load level depends on the current load level, and is a random variable. Nfront is independent of time. The Poisson distribution depends on a single parameter, the average.

A point estimate of the average IOPS expected at the average Nfront load level is a satisfactory basis for a capacity-planning estimate and is sufficient for demonstrating the model. The response time at various other load levels also may be approximated by the model, and weighted by the Poisson probability for the Nfront load level estimated. An example of integration over an interval of load level also will be discussed. Implementation facilities also provide an empirical probability distribution for Nfront. However, as it has been observed to deviate little from the Poisson distribution, the latter is generally sufficient, as are point estimates for the average, and the $99^{th}$ percentile, for instance, as specified by the SLS.

The examples that follow demonstrate the matrix operations of the model. Two matrices called mm01 for the differential of response times, and ms01 for the corresponding initial conditions of response time, as defined in table 1, are used throughout the examples:

$$mm01 \begin{bmatrix} .0025 & 0. & 0. & 0. \\ 0. & .0035 & 0. & 0. \\ 0. & 0. & .0045 & 0. \\ 0. & 0. & 0. & .0055 \end{bmatrix} \quad \text{EQUATION 4}$$

EQUATION 5

$$ms01 \begin{bmatrix} .003 & 0. & 0. & 0. \\ 0. & .004 & 0. & 0. \\ 0. & 0. & .005 & 0. \\ 0. & 0. & 0. & .006 \end{bmatrix}$$

The two basis matrices are intrinsic to the storage hardware they represent. Once a load level and a probability distribution is applied to the above matrices an expectation for response time for a given UOW∩UOS may be calculated.

The first probability distribution is a vector called p01. It is a single variable in four dimensions corresponding to the four dimensions of the basis, as defined by and corresponding to table 1. The sum of elements of the p01 vector is 1, which is a property of a probability distribution:

EQUATION 6

$$p01 \quad [.25 \;\; .25 \;\; .11 \;\; .39]$$

$$sum(p01^T) \quad [1.]$$

Multiplying Nfront with the differential linear operator defined by the matrix mm01 and adding the initial condition matrix ms01 to the result yields an estimate of response time for each component of the UOW:

EQUATION 7

$$5 \cdot mm01 + ms01$$

$$\begin{bmatrix} .0155 & 0. & 0. & 0. \\ 0. & .0215 & 0. & 0. \\ 0. & 0. & .0275 & 0. \\ 0. & 0. & 0. & .0335 \end{bmatrix}$$

The above is the estimated response time for each of the workload components at the specified load level of 5 in this example.

Scaling individual response times by the probability distribution, p01, and summing the result, the expectation of response time for the combination, 25 ms is obtained:

EQUATION 8

$$\text{sum}\left(\left(p01 \cdot \begin{bmatrix} .0155 & 0. & 0. & 0. \\ 0. & .0215 & 0. & 0. \\ 0. & 0. & .0275 & 0. \\ 0. & 0. & 0. & .0335 \end{bmatrix}\right)^T\right)$$

$$[.2534]$$

Applying Littles Law, X=N/R, provides an estimate of I/O capacity for this load level and workload composition, 197 IOPS:

EQUATION 9

$$\frac{5}{.02534} = 197.316$$

The above is an estimate of I/O capacity at 100% utilization. The application arrival rate is used to estimate utilization as the ratio of I/O capacity available. For instance, if the application average arrival rate is 80 IOPS, then the utilization is 80/197~41%.

The above example shows the basic model for response time estimates of a complex I/O workload.

A more complex example involves merging six workloads onto a single storage resource. The matrix mp06 represents six individual probabilities, the first of which is the vector p01 used in the previous example:

EQUATION 10

$$mp06 \begin{bmatrix} .25 & .25 & .11 & .39 \\ .35 & .21 & .15 & .29 \\ .5 & .15 & .3 & .05 \\ .25 & .33 & .1 & .32 \\ .65 & .2 & .15 & 0. \\ .4 & .15 & 0. & .45 \end{bmatrix}$$

This matrix, mp06, is not a proper probability distribution, because it does not sum to 1. It is a row stochastic matrix as each row sums to 1:

There are two equivalent ways to proceed, each having application to different ways of partitioning the workload. The first method corresponds to the grouping of workload units (UOW) into sub groups and treating each sub group as a single unit. The second method corresponds to combining all the UOW into a single unit.

1) A new probability distribution called mp08 is used to scale the differential and initial condition matrices, mm01 and ms01, thereby defining new differential and initial condition matrices, mm02 and ms02. The new basis includes the combined probability distributions of the six UOW defined in mp06.
2) The new probability distribution mp08 is used directly, as in the first example, using the original mm01 and ms01 basis matrices.

In both cases a 6-dimensional-probability matrix, mp07, the ring probability, defines the probability distribution of the six UOW to be combined from mp06. The mp06 row stochastic matrix is transformed into a proper probability distribution by operation of the mp07 matrix. The result is the new UOW probability distribution called mp08.

The matrix mp07 is the ring probability distribution that is used to scale the six UOW defined in mp06 against the 4-dimension basis as defined in table 1. It is in fundamental form, eigenvalues along the diagonal, to be used as an operator:

EQUATION 11

$$mp07$$

$$\begin{bmatrix} .150685 & 0. & 0. & 0. & 0. & 0. \\ 0. & .279452 & 0. & 0. & 0. & 0. \\ 0. & 0. & .178082 & 0. & 0. & 0. \\ 0. & 0. & 0. & .057534 & 0. & 0. \\ 0. & 0. & 0. & 0. & .224658 & 0. \\ 0. & 0. & 0. & 0. & 0. & .109589 \end{bmatrix}$$

$$\begin{bmatrix} \text{seq}(mp07[j, j], j, 1,3) \\ \{.150685 \;\; .279452 \;\; .178082\} \\ \text{seq}(mp07[j, j], j, 4,6) \\ \{.057534 \;\; .224658 \;\; .109589\} \end{bmatrix}$$

Each row of the matrix mp06 represents a UOW probability distribution. Associated with each UOW is an average Nfront. The ring probability distribution of a combination of UOW is defined as the relative magnitude of each Nfront to the sum of Nfront values. Two different examples in 4 dimensions follow:

EQUATION 12

$$[5\ \ 8\ \ 3\ \ 7]$$

$$\mathrm{sum}([5\ \ 8\ \ 3\ \ 7]^T)$$

$$\frac{[5\ \ 8\ \ 3\ \ 7]}{23.}$$

$$[.217391\ \ .347826\ \ .130435\ \ .304348]$$

$$\mathrm{sum}([.217391\ \ .347826\ \ .130435\ \ .304348])\blacktriangleright$$

$$[1.]$$

EQUATION 13

$$[22\ \ 31\ \ 15\ \ 27] \qquad [22\ \ 31\ \ 15\ \ 27]$$

$$\mathrm{sum}([22\ \ 31\ \ 15\ \ 27]^T) \qquad [95]$$

$$\frac{[22\ \ 31\ \ 15\ \ 27]}{95.}$$

$$[.231579\ \ .326316\ \ .157895\ \ .284211]$$

$$\mathrm{sum}\left(\left(\frac{[22\ \ 31\ \ 15\ \ 27]}{95.}\right)^T\right) \qquad [1.]$$

Continuing with the example, the six UOW, row stochastic matrix mp06, is multiplied by the corresponding ring probability, mp07, to produce a new UOW probability distribution, mp08, defining the relative portions of the six UOW. These proportions are with regards to the original differential and initial conditions of response time, mm01, and ms01, as defined in table 1. The mm01 and ms01 basis define the 4-dimensional space of which the six UOW of mp06 are points:

EQUATION 14

$$mp07 \cdot mp06 \rightarrow mp08$$

$$\begin{bmatrix} .037671 & .037671 & .016575 & .058767 \\ .097808 & .058685 & .041918 & .081041 \\ .089041 & .026712 & .053425 & .008904 \\ .014384 & .018986 & .005753 & .018411 \\ .146027 & .044932 & .033699 & 0. \\ .043836 & .016438 & 0. & .049315 \end{bmatrix}$$

$$\mathrm{sum}((\mathrm{sum}(mp08))^T) \qquad [1.]$$

The second method simply applies the new probability distribution, mp08, to the original basis mm01 and ms01 as defined in table 1:

EQUATION 15

$$sum((sum(5 \cdot mp08 \cdot mm01 + mp08 \cdot ms01))^T)$$

$$[.022433]$$

The second part of the example solves for the stripe width element of a UOS to achieve a predetermined response time according to a given SLS. A library of UOW∩UOS, differentials and initial conditions, is searched to locate the minimum differential and initial conditions. A smaller value implies a solution requiring less physical resources than a solution with a larger value. For the current example it is assumed that the basis defined in table 1 is the best fit.

Using the above defined basis in table 1, and the UOW and associated probability distributions developed in the previous examples, UOS requirements to satisfy the UOW at a given response time are presented.

The model solves for the utilization level specified by the SLS by determining first the required response time to satisfy the SLS, and then the UOS stripe width required to satisfy the response time.

One of the elements associated with the WFNS is the arrival_rate distribution (and moments: average, standard deviation . . . ) of I/O to the named workflow object.

One of the elements of the SLS is a utilization factor.

One of the elements of the UOW is Nfront.

To solve for the stripe width of the SLS, for a given candidate basis UOS, the process first determines the target response time at the specified utilization.

$$R_{target} = [N\mathrm{front}/\mathrm{arrival\_rate}] \cdot \mathrm{utilization} \qquad \text{EQUATION 16}$$

Proceeding with the example, defining a utilization factor of 50% (0.50), Nfront of 5, and arrival_rate 1200:

EQUATION 17

$$\frac{5}{1200} \cdot .5 \qquad .002083$$

$$\frac{5}{.0020833333333334} \cdot .5 \qquad 1200.$$

$$R_{target} = 0.002083$$

The model solves for $R_{target}$ by reducing the system to a single linear equation representing the state vector of response time. The n-dimensional system of UOW and associated probability distributions converge to:

$$R = mN + s \qquad \text{EQUATION 18}$$

Solving for N yields:

$$N = (R - s)/m \qquad \text{EQUATION 19}$$

The convergence is carried out separately for the differential and initial condition matrices by taking the row marginal distribution of the simple or complex UOW matrices.

Returning to the UOW definitions of the first example:

EQUATION 20

$$mm01 \begin{bmatrix} .0025 & 0. & 0. & 0. \\ 0. & .0035 & 0. & 0. \\ 0. & 0. & .0045 & 0. \\ 0. & 0. & 0. & .0055 \end{bmatrix}$$

EQUATION 21

$$ms01 \begin{bmatrix} .003 & 0. & 0. & 0. \\ 0. & .004 & 0. & 0. \\ 0. & 0. & .005 & 0. \\ 0. & 0. & 0. & .006 \end{bmatrix}$$

■p01 [0.25 0.25 0.11 0.39] EQUATION 22

The total differential of response time, m, and initial condition, s, of this system:

EQUATION 23

$$\mathrm{sum}((\mathrm{sum}(p01 \cdot mm01))^T) \rightarrow m \qquad [.00414]$$

$$\mathrm{sum}((\mathrm{sum}(p01 \cdot ms01))^T) \rightarrow s \qquad [.00464$$

Applying the model to solve [Ndd=(R−s)/m] yields ($R=R_{target}=rt$):

$$rt \quad .002083 \qquad \text{EQUATION 24}$$
$$s \quad [.00464]$$
$$m \quad [.00414]$$
$$\frac{rt - s[1,1]}{m[1,1]} \quad -.617633$$

The answer is in the negative indicating that the system has no solution. This condition can be recognized at once by noting that the target response time, called rt in the calculation, is already lower than the initial condition of response time for the system. The initial condition of the state vector of response time, as represented by the convergent series above, is the smallest response time possible for the given UOW∩UOS.

For the model UOW∩SLS≈UOS to have a solution, the target response time obtained by the constraints of the SLS must be greater than or equal to the convergent series of initial conditions matrix defined by the UOW∩UOS.

To resolve this issue: 1) the constraints on the system with regards to the utilization requested by the SLS may be relaxed, and/or 2) Nfront increased by tuning the application, and/or 3) seek faster hardware, and/or 4) if the UOW is a complex combination of UOW (a matrix with more than just the eigenvalues on the diagonal), separate the UOW into components and determine if each is solvable on its own, repeating the above process for each of the UOW.

The requisite low response time in this example is driven by the low utilization requirement of 50%, and a rather low load level of 5, and a rather high arrival_rate of 1200.

Continuing the example to explore options to resolve the system:

Relaxing Utilization:

$$R_{target}=[Nfront/arrival\_rate]\cdot utilization \qquad \text{EQUATION 25}$$

$$\frac{5}{1200.}\cdot 1 \quad .004167 \qquad \text{EQUATION 26}$$
$$.0041666666666667 - s \quad [-.000473]$$

At 100% utilization the system has a solution, (s is larger than $R_{target}$). However, it may not be desirable to configure the system for 100% utilization. Some amount of headroom may be necessary.

Increasing Nfront:

Returning to the original requirement of 50% utilization, solving for Nfront, given the model for $R_{target}$.

The goal is to find the minimum Nfront for which the system is solvable. This is determined by the convergent series of the initial condition matrix, s, in the current example:

$$Nfront=[arrival\_rate\cdot s]/utilization,\ s=R_{target} \qquad \text{EQUATION 27}$$

$$s[1,1] \quad .00464 \qquad \text{EQUATION 28}$$
$$\frac{1200\cdot s[1,1]}{.5} \quad 11.136$$

At Nfront 11.136 the system is solvable:

$$R_{target}=[Nfront/arrival\_rate]\cdot utilization \qquad \text{EQUATION 29}$$

$$\frac{11.136}{1200}\cdot .5 \quad .00464 \qquad \text{EQUATION 30}$$
$$.00464 - s[1,1] \quad 0.$$

$$\frac{11.136}{1200}\cdot .5 \rightarrow rt \quad .00464 \qquad \text{EQUATION 31}$$

$R_{target}$=0.00464

Assuming the application may be tuned for higher concurrency, so that the same arrival rate is demanded from an average of 12 streams rather than 5, the process returns to the example to solve for $R_{target}$ at the new load level. The system will incur a point of singularity if the exact root above is used. It is necessary to round up to 12 in order to avoid the singularity and assure that R is less then or equal to $R_{target}$:

$$\frac{rt - s[1,1]}{m[1,1]} \quad 0; \qquad \text{EQUATION 32}$$
$$\frac{12}{1200}\cdot .5 \rightarrow rt \quad .005$$
$$\frac{rt - s[1,1]}{m[1,1]} \rightarrow ndd \quad .086957$$

$R_{target}$=0.005

$$[Ndd=(R-s)/m]=0.86957,\ R=R_{target}=rt \qquad \text{EQUATION 33}$$

The required UOS→stripe_width is:

$$[Nfront/Ndd] \qquad \text{EQUATION 34}$$

$$\frac{12}{.086957} \quad 137.999 \qquad \text{EQUATION 35}$$
$$rt \quad .005$$

UOS→stripe_width=138:

It has been determined that, for the UOW∩SLS under consideration, with an Nfront of 12; 138 units of the specified UOS may meet the response time target of 0.005.

The same process of solving for Ndd, based on the convergent series of differential and initial condition matrices, and the formula provided, work in a similar manner with compound UOW matrices (one row for each UOW with a correspond probability ring) as discussed above.

An example integration of Littles Law with the model of response time both in mean value and utilizing a Poisson probability distribution of Nfront is now presented. As mentioned previously, point estimates of the average and upper percentile are generally sufficient in practical application of the model. Integration may however, especially with an empirical probability distribution of Nfront, define precisely the mathematical expectation of throughput.

The antiderivitive of Littles Law, X=N/R, with the model for response time R=Nm+s over a load level interval from a to b:

EQUATION 36

$$\int_a^b \left(\frac{n}{n\cdot m+s}\right)dn$$

$$\frac{s\cdot\ln(|s+a\cdot m|)-s\cdot\ln(|s+b\cdot m|)-(a-b)\cdot m}{m^2}$$

Proceeding, as in the previous example, by defining the state vector of response time as a convergent series of differentials, initial conditions and probabilities:

EQUATION 37

$$mm01 \quad \begin{bmatrix} .0025 & 0. & 0. & 0. \\ 0. & .0035 & 0. & 0. \\ 0. & 0. & .0045 & 0. \\ 0. & 0. & 0. & .0055 \end{bmatrix}$$

$$ms01 \quad \begin{bmatrix} .003 & 0. & 0. & 0. \\ 0. & .004 & 0. & 0. \\ 0. & 0. & .005 & 0. \\ 0. & 0. & 0. & .006 \end{bmatrix}$$

$$p01 \quad [.25 \quad .25 \quad .11 \quad .39]$$

$$\text{sum}((\text{sum}(p01\cdot mm01))^T)\to m \quad [.00414]$$

$$\text{sum}((\text{sum}(p01\cdot ms01))^T)\to s \quad [.00464]$$

$$m[1,1]\to m \quad .00414$$

$$s[1,1]\to s \quad .00464$$

The area under the throughput curve, representing the number of I/O completed in one unit of time (second) at each load level from, a=1 to b=9, and mean value:

EQUATION 38

$$a \quad 1$$

$$b \quad 9$$

$$m \quad .00414$$

$$s \quad .00464$$

$$\int_a^b \left(\frac{n}{n\cdot m+s}\right)dn \quad 1509.29$$

$$\frac{1}{b-a}\cdot 1509.2863482541 \quad 188.661$$

Mean value=189 IOPS. The average load level is 5:

EQUATION 39

$$b-a \quad 8$$

$$8/2 \quad 4$$

$$4+a \quad 5$$

$$\frac{1+2+3+4+5+6+7+8+9}{9} \quad 5$$

The point estimate for the average:

EQUATION 40

$$\begin{bmatrix} sum((sum(5\cdot mp01\cdot mm01\cdot+\cdot mp01\cdot ms01))^T) & [1,1] \\ & .02535 \\ \frac{5}{.02534} & 197.316 \end{bmatrix}$$

The point estimate agrees to within 4% of the integration mean value. Applying the Poisson distribution to each Nfront load level:

EQUATION 41

$$\sum_{n=1}^{9}\left(\frac{n}{n\cdot m+s}\cdot e^{-5}\cdot\frac{5^n}{n!}\right) \quad 182.416$$

The expectation is 182 IOPS and is within 4% of the integration mean value, and within 8% of the point estimate.

System Components

Referring now to FIGS. 15–23, various embodiments of operational components of data storage management systems constructed according to the invention will be discussed. In general, these operational components may be implemented in hardware and/or software. Significant blocks are treated separately in the discussion for each figure including a description of the operation of the components and the interactions of the component with other components in FIGS. 15–23.

Figure 15:
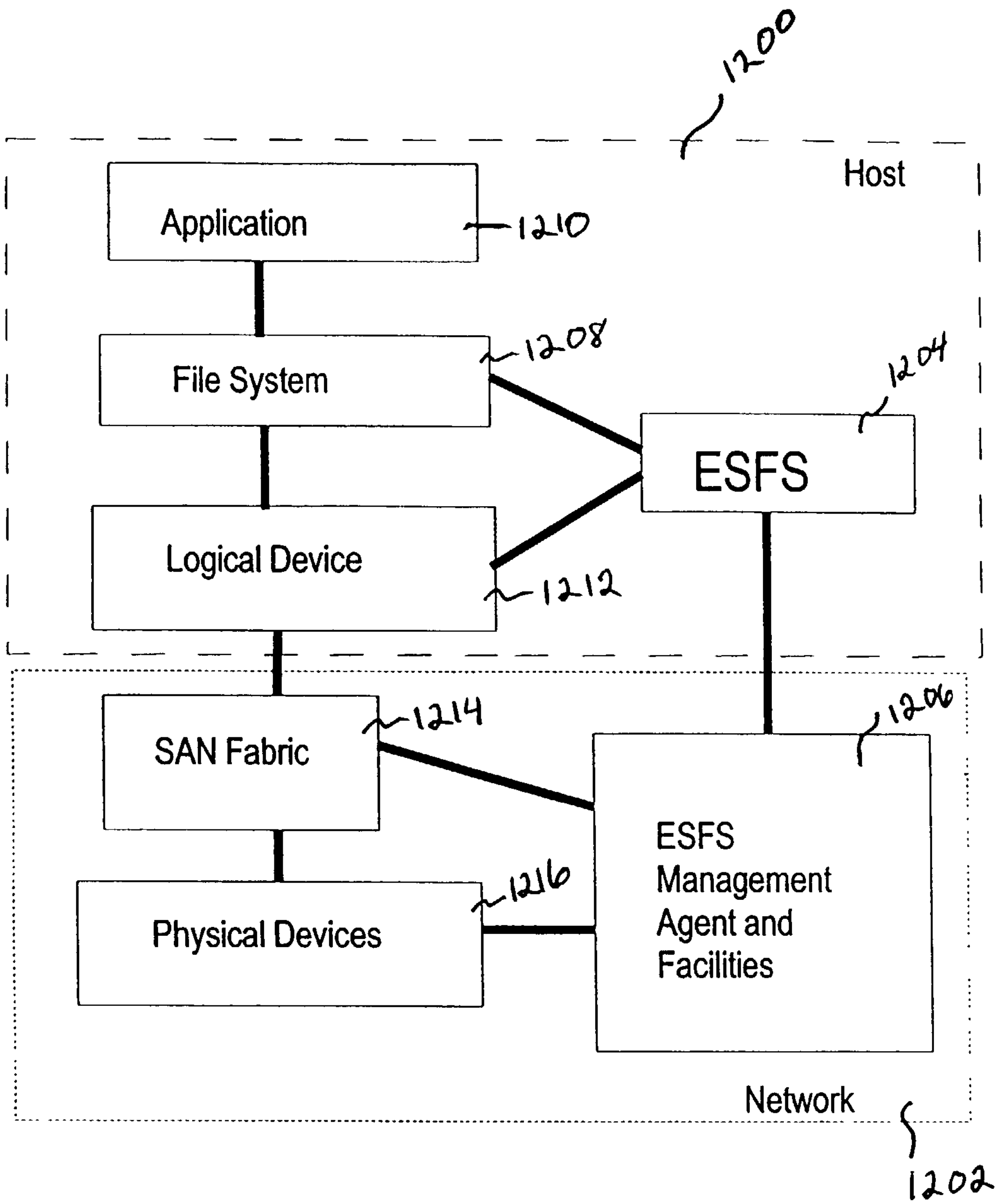
FIG. 15 is a block diagram of one embodiment of a data processing system constructed in accordance with the invention.

FIG. 15 is a block diagram of one embodiment of a computing system constructed according to the invention. The computing system includes data storage management system components that provide automated storage configuration, replication and connectivity. To this end, the data storage management system tracks workflow to determine storage resource allocation and utilization as discussed in conjunction with FIGS. 16–23.

In FIG. 15, a host processor 1200 communicates with networked data storage resources 1202. In accordance with one embodiment of the invention, the system includes encapsulated storage file system components 1204 and 1206 as described herein. Thus, the ESFS 1204 cooperates with a file system 1208 to provide an encapsulation layer to monitor I/O activity between an application 1210 and a logical device 1212. In addition, the EFSF management agent and facilities 1206 manages the SAN fabric 1214 and the physical devices 1216 in the networked data storage resource 1202 to allocate resources to meet performance objectives.

ESFS ("FSE") 1204

This component is an administrative interface for SLS, application instrumentation, and logical address space mapping control. It depends on WNS, WLM and IOS and serves the Application 1210. Inputs are 1) Existing File System and/or raw device, 2) ESFS workflow directory name. The output of the component is File System or Device Encapsulated.

ESFS provides an administrative name space, specifically, the ESFS Workflow Name Space as an abstraction layer for the allocation and monitoring of storage resources, for both new and existing file systems and raw logical volumes contained in an encapsulated file system. Additionally, it implements workload instrumentation for use by the Analysis Prediction and Solution facility. The directories in this file system are WFNS names, being driven off the network DDS facility. The files, in this file system, shadow the encapsulated logical resources associated with a real file system and/or raw logical volumes, in the real file system.

The address space mapping between the logical and physical devices may be dynamically updated to optimize I/O performance. I/O scheduling may include I/O priority, and optimal layout based on complementary time domain access probability.

Associated with a WFNS name is, an application, a UOW analysis of I/O of devices in use by the application, an SLS for the supporting UOS, a history of UOW and performance results, and a probability density for the application relative to the rest of the encapsulated resources in the WFNS.

An administrator requests a storage allocation for a workflow name, and the system will specify the storage configuration to meet the allocation within the SLS, based on the current pool of resources. When the SLS can no longer be satisfied with the storage pool authorized for the workflow directory, the administrator will be notified to allocate additional resources to the workflow name.

Figure 16:
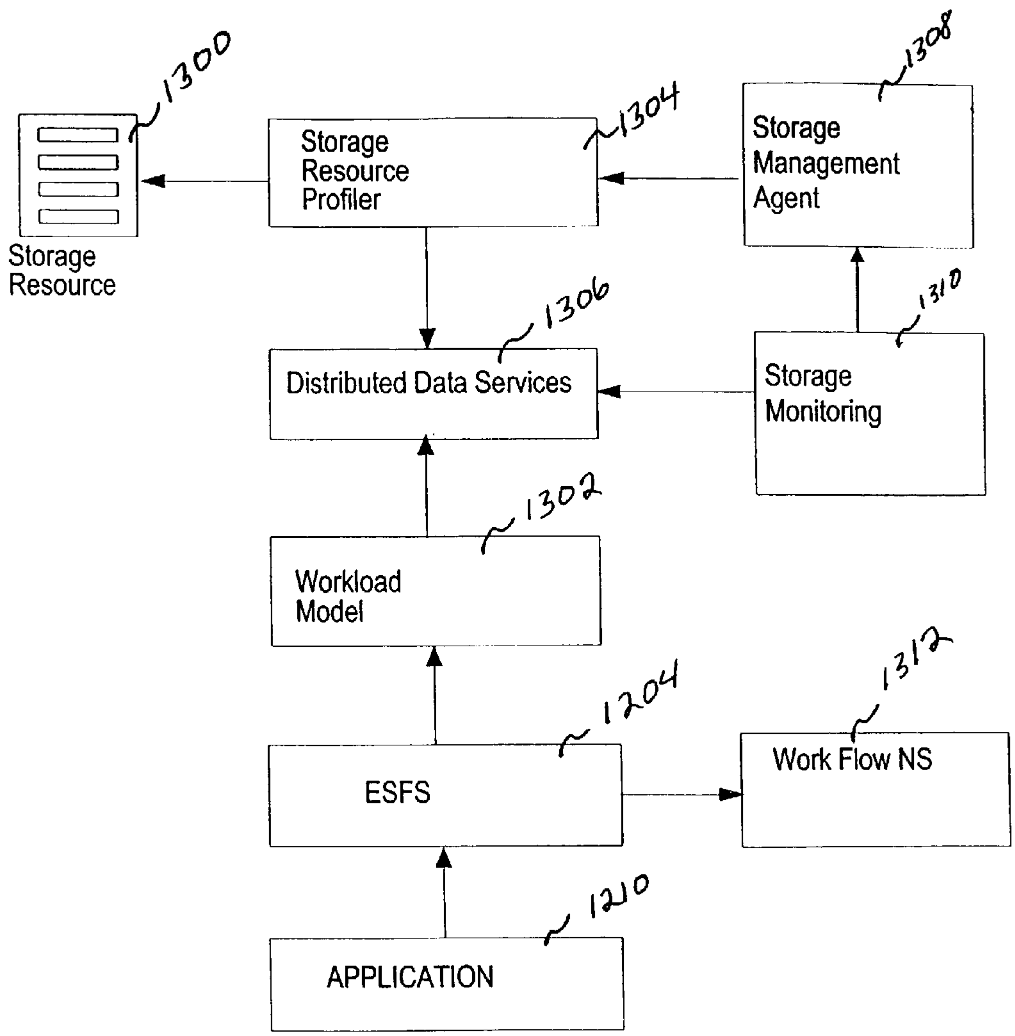
FIG. 16 is a block diagram of one embodiment of data storage management operational components in accordance with the invention.

FIG. 16 depicts operational components relating to acquiring empirical data (e.g., a workload model and a profile of a data storage resource 1300) and associating the empirical data with a workflow name space.

Workload Modeling ("WLM") 1302

This component provides workload context definition for an application and/or address range. It depends on DDS and serves FSE. Inputs are 1) UOW events as measured in real time by ESFS, and 2) Workflow NS name [address,size]. The output of the component is the Unit of Work definition saved to the DDS facility and associated with the WFNS name.

A UOW is defined for each encapsulated resource associated with an ESFS workflow directory name. It describes the workload and performance of a set of logical and physical resources associated with an application through the WFNS name. Historical audit trails of the UOW per workflow name are maintained for workflow analysis in the DDS. For instance, time series analysis is provided to identify trend T, seasonal component S, cyclic component C, and irregular variation V, of the named workflow object.

Data structures defined by this facility are used by the Performance Analysis Prediction and Solution facility through the Distributed Data Services facility. The UOW are partitioned by elements of the UOW: I/O size, address range, probability distribution for Nfront, and a Bernoulli Distribution with regards to Access Type (rr, rw, sr, sw); a 1, in a given bit position indicates an instance of the associated workload characteristic. The resultant collection of bit strings and relative frequency of 1 s is a measure of joint probability. The result is a measure space of the joint probability of workload characteristics.

Marginal limiting probabilities are obtained by relative frequency summation of Access Type bit fields, per I/O size and range, and weighted by the Probability Density for each UOW by the Analysis, Prediction and Solution facility to establish expected performance for a UOW∩UOS.

Storage Resource Profiling ("SRP") 1304

This component provides analytical bases for response time estimates. It depends on DDS and serves SMA. Inputs are 1) Profile Request Descriptor, and 2) Storage Descriptor. The output of the component is Point Slope intercept of response time differential with respect to load level for each UOW∩UOS combination requested, full spectral analysis by default.

The component provides the key analytical data, and empirical basis, for complex response time expectation for a UOW∩UOS combination as discussed above. The components returns the slope of response time differential with respect to load level and initial condition (single threaded access) for a specific UOW as applied to a specific UOS.

These data are collectively, a point slope linear equation for each pure, fundamental UOW∩UOS combination, and are obtained from direct measurement of the storage resource as directed/requested by the Storage Management Agent.

This profiling may be destructive to the data in the storage media, and may require an initial non-recurring dedicated resource for the measurement. As new resources, or new configuration options are added to a storage pool, new measurements may be needed to provide the best model results.

Distributed Data Services ("DDS") 1306

This component provides a network wide information database. It depends on LDAP and serves WNS, WLM, SRP, SPM, SAC, APS, SMA, UPM, AMS, SLV, CPA and CAA. Inputs include UOW, SLS, UOS and ESFS Workflow NS. The output of the component includes UOW, SLS, UOS and ESFS Workflow NS.

This component provides general purpose distributed data services. It provides the ESFS name space abstraction and relates application demand and resource capacity to workflow name space objects.

Storage Management Agent ("SMA") 1308

This component is a general facility to implement actions and services. It depends on SRP, LDC, FSC, OSC, SAC, APS, DDS, SRA, RPS, PDC, CPA and CAA and serves WNS, UPM and SPM. Inputs are Request for actions. The output of the component is Actions Implemented.

This component is the command and control hub of distributed services over private VPN network, and the primary facilitator of product functionality. This is an inetd (1M) based service responding to requests on registered network ports. All user interface code, GUI or otherwise, may be implemented by calls to the SMA via network based protocol via the UNIX inetd facility. In one embodiment no functionality, other than interaction with the user, is implemented in the user interface layer. The SMA handles all requests by the user interface, and/or other client components.

Storage Performance Monitoring ("SPM") 1310

This component is a facility to provide real-time feed back on accuracy of predictions and expectations and to provide threshold alerts for SLS requirement boundary conditions. It depends on SMA and DDS. Inputs are Expected vs. Realized performance data from the DDS. The output of the component is Alerts and/or Event generation for corrective action.

This facility is a sub-set of Utilization and Performance Management. It reports/records the standard error distribution of expected vs. realized for the SLS relative to the UOS associated with a WFNS name. If prediction levels are not satisfactory, a higher resolution analysis with updated sample of workload and or storage resource may be requested. Threshold events of performance relative to the SLS are reported/recorded and may generate requests for action.

Event driven actions includes reconfiguring the I/O address space of the application non-disruptively, and dynamically.

Workflow Name Space ("WNS") 1312

This component provides a means of associating application workload and resource usage by customer-defined business application and/or process names, presented as a file system tree, whose leaf nodes shadow the managed resources of real file systems and or raw devices. It depends on DDS and serves FSE. Inputs are 1) ESFS workflow directory name, and 2) File systems and/if raw devices to be encapsulated and managed. The output of the component provides a virtual file system directory tree associating business applications with performance specifications, resource allocation and utilization data.

Encapsulated file systems and/or raw devices are associated with the ESFS workflow name space. The system maintains a normalized view of application demand, resource capacity and utilization across the name space. For example, 100% of the resource and 100% of the demand are associated with the root level of name space tree, representing the sum total of encapsulated resources for a company. At this level the system will provide an overall description of the company workload and utilization. As the name space tree is divided into department, cost pools, and other business process names, the workflow name space maintains relative demand, capacity and utilization for the department, cost pool and business process. See, for example, the probability distributions in FIG. 14. This process continues down to the leaf nodes in the tree where specific storage resources, for specific applications for specific department, cost pool, or business processes are located.

With context sensitive logical address space, the tree drills down yet further to identify address ranges within a single application device. The workflow name space is accessed through the administrative mount point of ESFS, and spans a companies operation network wide.

Figure 17:
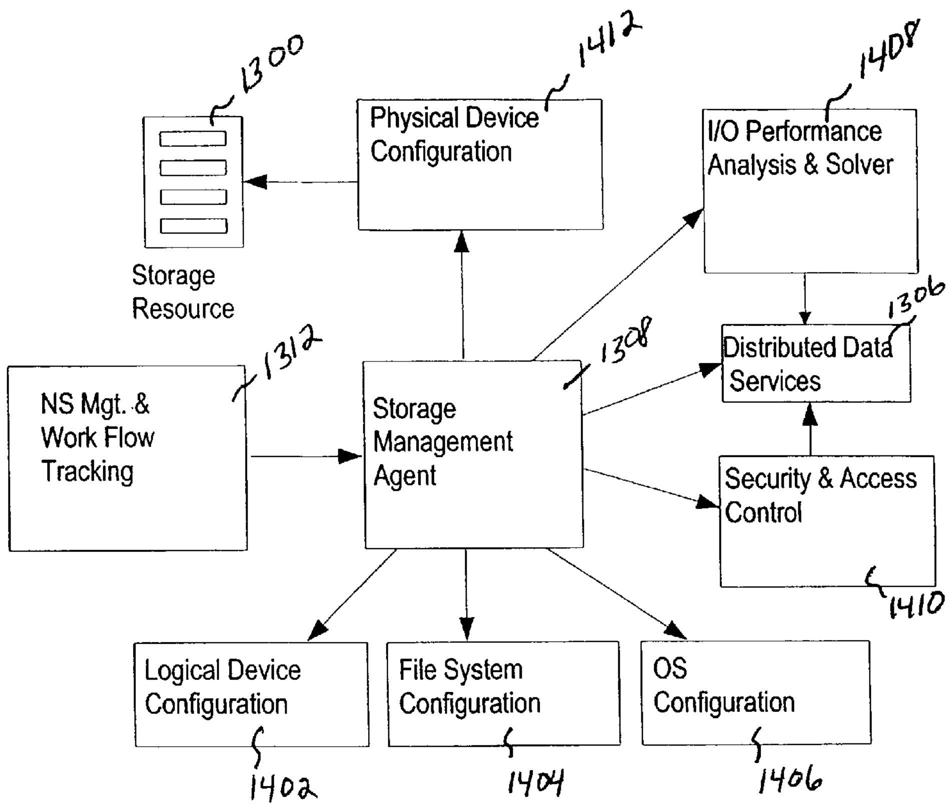
FIG. 17 is a block diagram of one embodiment of data storage management operational components in accordance with the invention.

FIG. 17 depicts operational components relating to the control of system operation by a storage management agent.

Logical Device Configuration ("LDC") 1402

This component provides facilities to create logical devices from physical resources according to context sensitive storage configuration design specifications derived by the APS, and requested by the SMA. It depends on Logical Volume Management Product and serves SMA. Inputs are 1) Storage Descriptor, and 2) UOS Specification.

Logical devices are configured to directly satisfy an application file system or raw device I/O requirement for an application. They are the UOS objects of I/O capacity and storage space allocation designed to satisfy the SLS associated with the workflow name space application. This component provides a level of abstraction for converting the specification of a UOS to the required commands to create an operating system logical device to satisfy the SLS. This may be implemented, for example, using a VxVM, or SDS, by the generation of batch command line scripts, or other API.

File System Configuration ("FSC") 1404

This component provides facilities to build or tune a file system. It depends on File System Product and serves SMA. Inputs are 1) UOW∩UOS, and 2) Logical Device on which to build a file system or Logical Device containing a file system to tune.

This component provides a level of abstraction for converting the specification of a UOW∩UOS to the required commands to create or tune a file system to satisfy the SLS. This will generally be implemented using UFS, QFS or VxFS, by the generation of batch command line scripts, or other API.

OS I/O Configuration ("OSC") 1406

This component provides facilities to adjust kernel I/O parameters based on context of UOW. It depends on the Operating System and serves SMA. Inputs are 1) UOW, and 2) Host.

This component provides a level of abstraction for converting the specification of a UOW∩UOS to the required commands to tune the operating system I/O path to satisfy the SLS. This will generally be implemented using Solaris by the generation of batch command line scripts, or other API.

This component may include an API level interface for kernel I/O variable management.

I/O Performance Analysis, Prediction & Solution ("APS") 1408

This component is a facility to apply Spectral Analysis and Linear Transformation of a workload's component proportions by a storage resource's response time differentials with application of Littles' Law and Amdahl's Law to determine an optimal solution for a given UOW∩SLS requirement or to provide an estimate of a given UOW∩UOS. It depends on DDS and LSS and serves SMA and IOS. Inputs are 1) UOW and SLS, or 2) UOW and UOS. The output of the component is 1) UOS specification for satisfying the UOW at the SLS, 2) Expected Throughput, Response Time and Utilization for the UOW∩UOS.

This module applies the analytical model to make a prediction for a "what if" analysis, or to solve a system of equations representing the constraints of the SLS, the demand of the UOW and the available storage resources.

Security and Access Control ("SAC") 1410

This component checks credentials of user and workflow name authorizations with regard to the requested operations. It depends on the Operating System, Database, Framework and LDAP and serves SMA. Inputs are 1) ESFS Workflow name, and 2) Type of access desired. The output of the component is Status.

This component provides a level of abstraction for authorization of operations based on authentication of the requester. This may be implemented using standard network login protocols and LDAP password and group files, and other security extensions as needed.

Physical Device Configuration ("PDC") 1412

This component is a facility to define RAID devices or other logical storage resource in a device dependent manner. It depends on Storage resource APIs and serves SMA. Inputs are UOS. The output of the component is a device configured to UOS specification.

Provides a level of abstraction for the device dependent configuration of physical storage resources.

Figure 18:
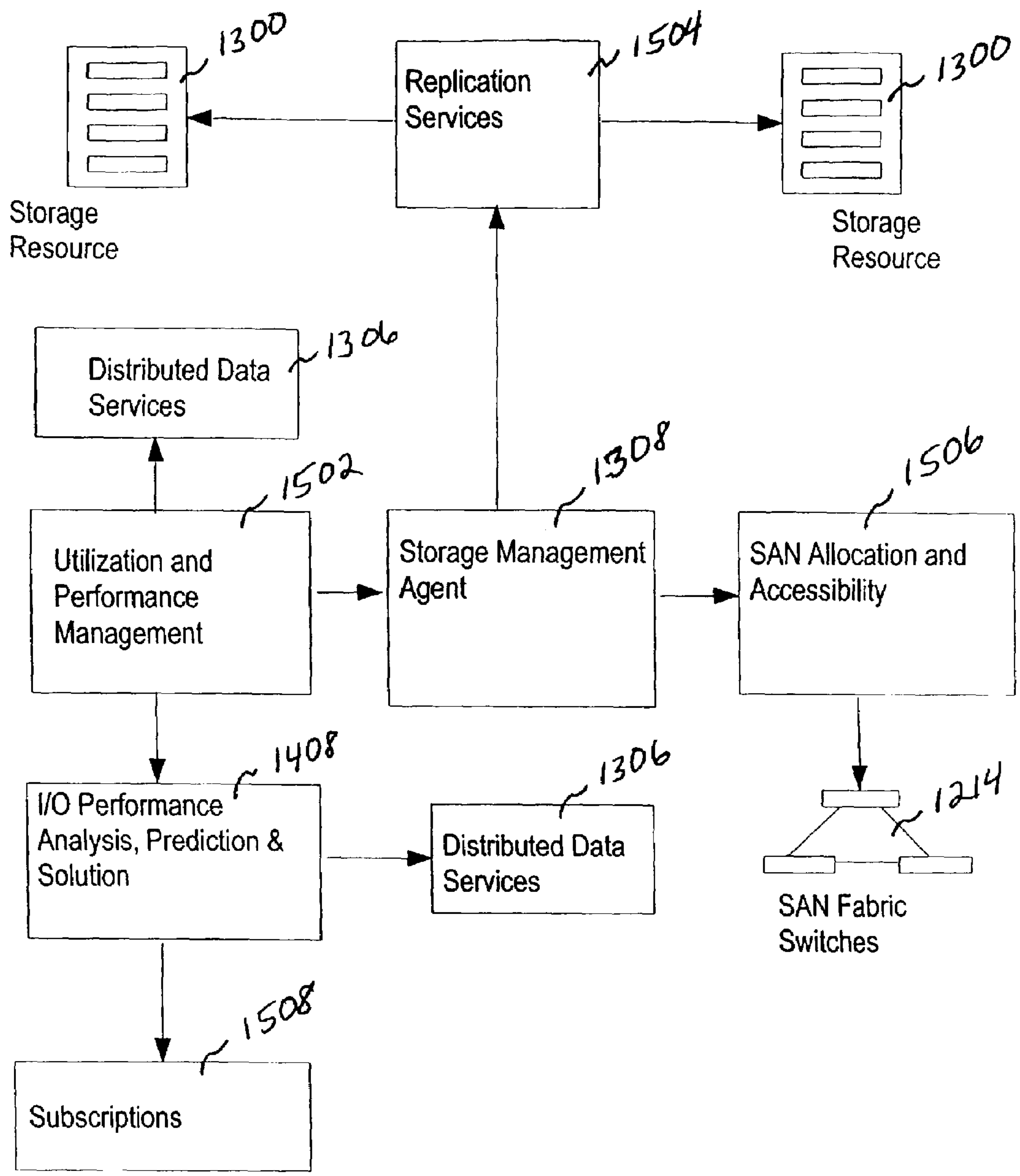
FIG. 18 is a block diagram of one embodiment of data storage management operational components in accordance with the invention.

FIG. 18 depicts operational components relating to a utilization and performance manager that may automatically invoke reconfiguration operations.

Utilization and Performance Management ("UPM") 1502

This component provides utilization assessment and provides preemptive action and/or alerts for utilization levels over SLS thresholds. It depends on SMA, APS and DDS. Inputs are ESFS Workflow NS objects. The outputs of the component are Alerts-and/or reconfiguration events.

This component monitors the real-time performance and utilization of the system resources and compares expectation to actual. This component validates prediction accuracy and calculates prediction error margins and invokes corrective action to assure SLS for each UOW. Utilization is based on context sensitive assessment of the UOW∩UOS.

Replication Services.("RPS") 1504

This component copies data from source to destination for replication and/or re-layout of logical to physical address space mapping. It depends on Operating Environment and/or 3rd party utilities for replication services and serves SMA. Inputs are 1) Source logical device, and 2) Destination logical device.

This component provides a level of abstraction for point in time copy. RPS may be invoked in response to context sensitive address space optimization, or utilization threshold events.

SAN Allocation and Accessibility (SRA") 1506

This component is a facility for allocating storage resource and connectivity bandwidth over the SAN. It depends on SAN fabric and storage resource APIs and serves SMA. Inputs are UOS specification for provisioning. The output of the component is WWNs of resource allocation set.

This component provides a level of abstraction for SAN fabric resource allocation.

Library Subscription Services ("LSS") 1508

This component provides subscription services for library of UOW and UOS models from an Internet based central repository. It depends on Published UOW and UOS library data and serves APS. Inputs are 1) UOS, 2) UOW of interest, and 3) Workflow class names. The output of the component is Storage profile library data.

When specifying new storage resources for a new application, or when seeking optimal storage resources for a growing application, this component provides workload models and storage resource profiles for workloads and/or storage resources not in the current environment.

Figure 19:
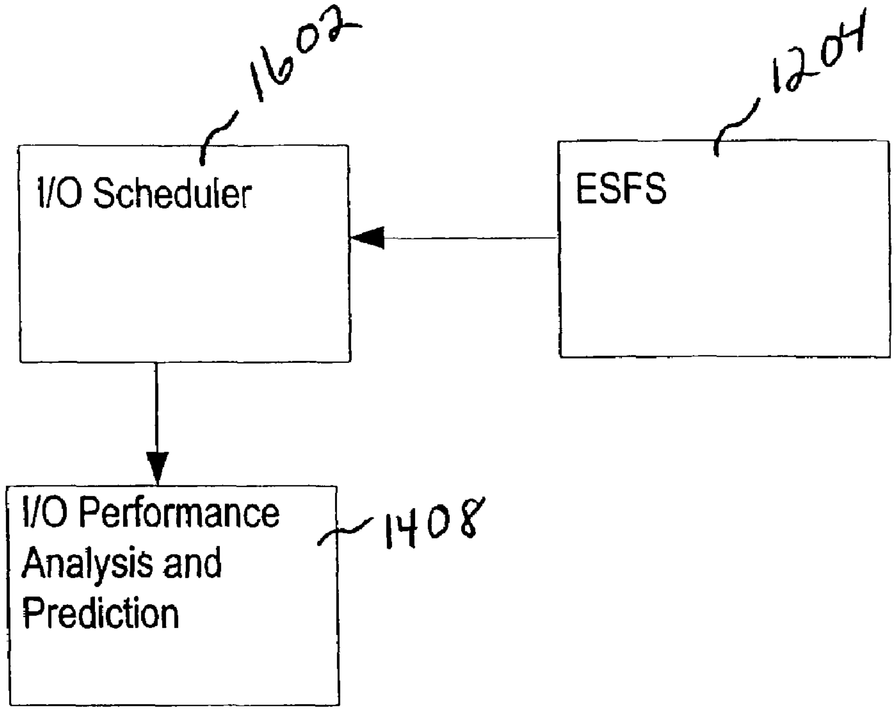
FIG. 19 is a block diagram of one embodiment of data storage management operational components in accordance with the invention.

FIG. 19 depicts operational components relating to I/O scheduling.

I/O Scheduler for Optimization and Priority ("IOS") 1602

This component implements I/O dispatch algorithms based on priorities and complementary time domain access distributions of workflow objects. It depends on APS and serves FSE. Inputs are ESFS Workflow NS objects I/O stream.

This component is a physical resource shared by multiple application objects, which tend not to be active at the same time. Thus, this provides a level of virtual I/O capacity. A phase shift in the timing of I/O requests is provided by inserting very small delays in one or more I/O request streams, so that when those I/O requests proceed, they will do so without contention.

Figure 20:
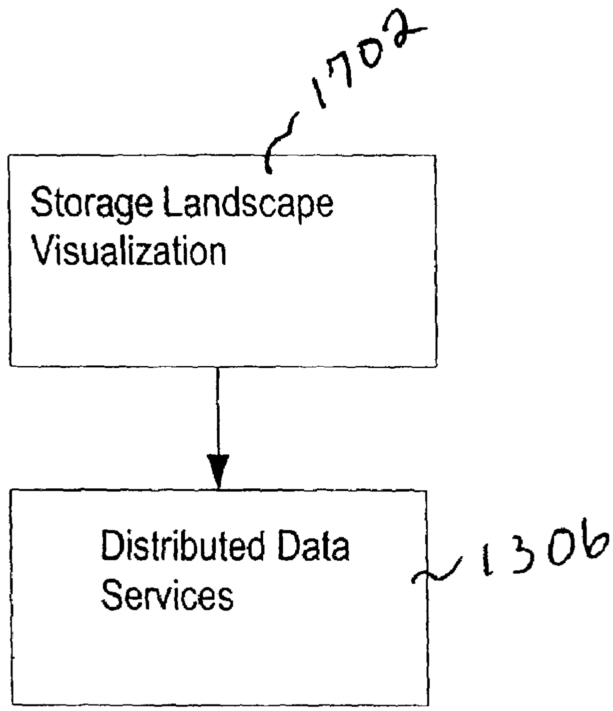
FIG. 20 is a block diagram of one embodiment of data storage management operational components in accordance with the invention.

FIG. 20 depicts operational components relating to graphical display of system information.

Scientific Visualization of the Storage Landscape ("SLV") 1702

This component is a facility to generate a Color, texture, 3-D topology/contour graphic representing variation in demand/capacity of the storage domain. It depends on DDS. Inputs are SAN topology with UOW∩UOS mappings. The output of the component is a graphic model.

This component provides an intuitive visual representation of ESFS Workflow NS with respect to resources allocated, workload levels, performance and utilization.

Figure 21:
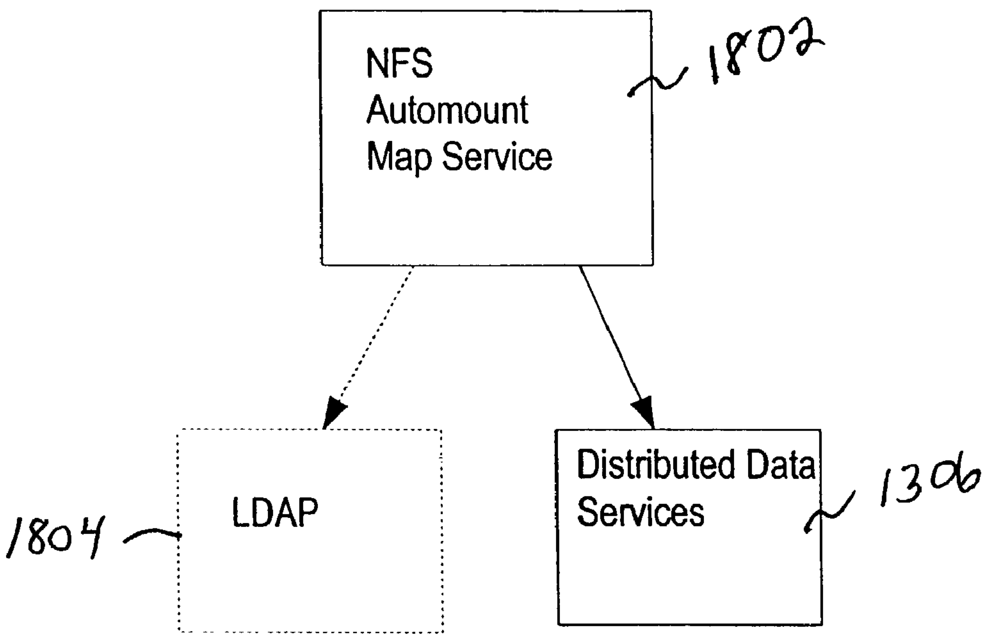
FIG. 21 is a block diagram of one embodiment of data storage management operational components in accordance with the invention.

FIG. 21 depicts operational components relating to making the workflow name space available over NFS using NFS automount maps.

NFS Automount Map Service ("AMS") 1802

This component provides a standard interface for mapping abstract name space to traditional NFS mounts and future IPFC virtual network connections for storage over IP. It depends on DDS and serves LDAP 1804, NIS and NIS+. Inputs are ESFS Name space. The output of the component is Automount maps for resource access over NFS and FCIP.

This component provides a level of abstraction and leverage for shared access over standard resource mapping utility, the automount map facility of NFS. This service provides access to the WFNS over NFS.

Figure 22:
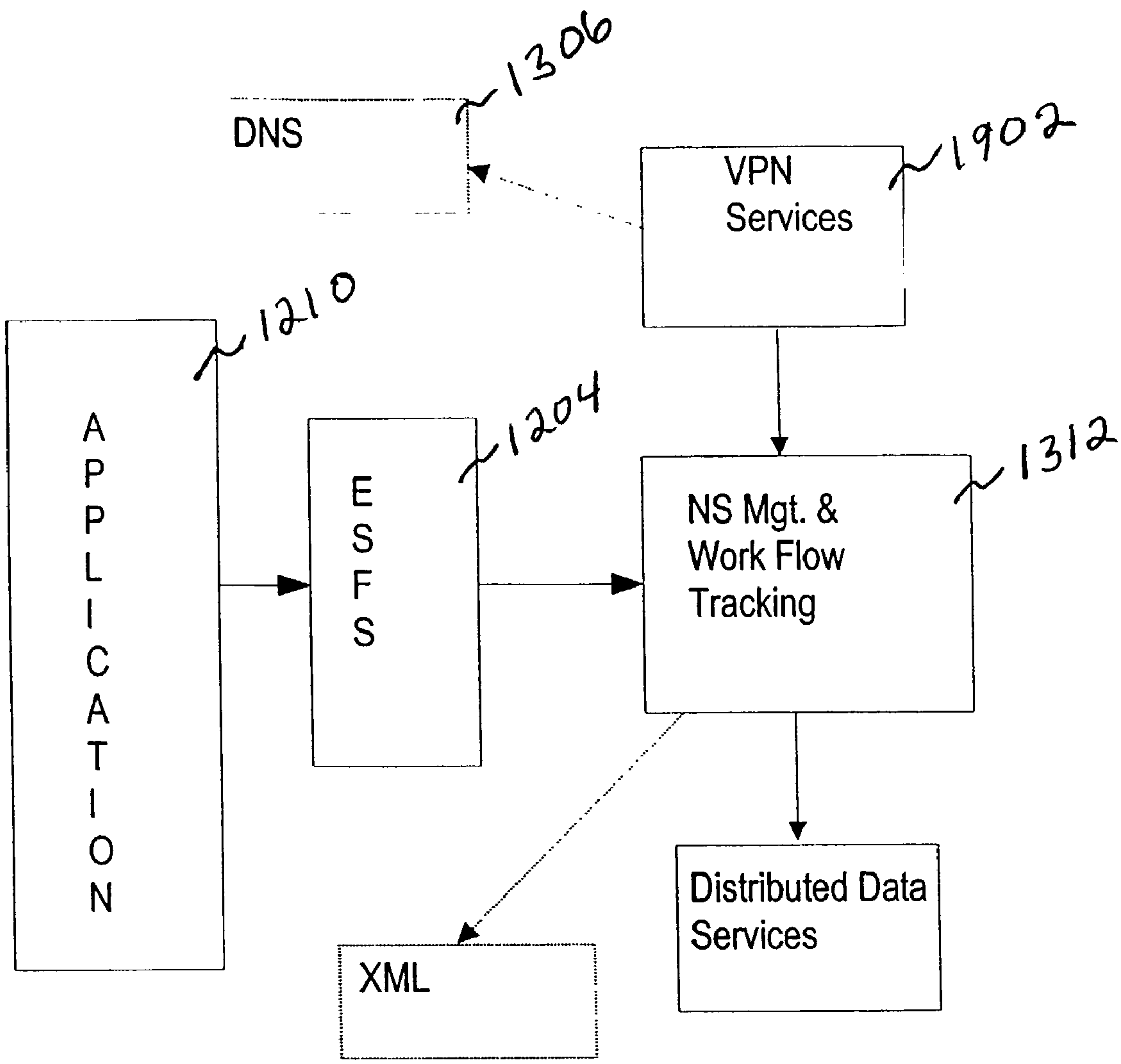
FIG. 22 is a block diagram of one embodiment of data storage management operational components in accordance with the invention.

FIG. 22 depicts operational components relating to providing network access to the data storage management system.

VPN Services ("VPS") 1902

This component provides access to the storage management facilities through a private secure IP network. It depends on WNS. Inputs are ESFS workflow name. The output of the component is VPN to private storage management IP network.

This component provides access control to the private storage management network.

Figure 23:
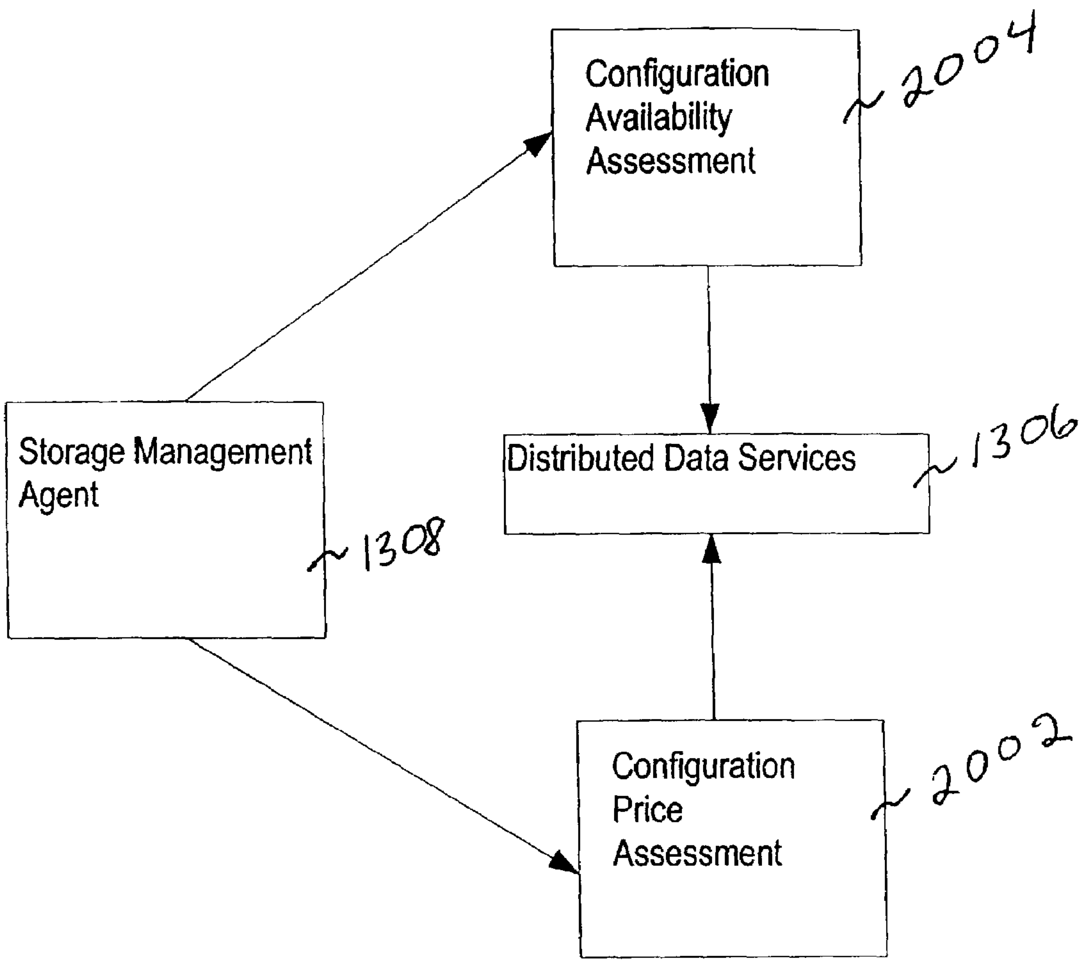
FIG. 23 is a block diagram of one embodiment of data storage management operational components in accordance with the invention.

FIG. 23 depicts operational components relating to satisfying availability and price constraints.

Configuration Price Assessment ("CPA") 2002

This component provides a means of differentiating configuration options with regard to price in addition to performance and availability considerations. It depends on DDS and serves SMA. Inputs are UOS. The output of the component is Estimated price.

The configuration design involves a balance of price, performance and availability. This module is used to provide a basis of price comparison in the decision process.

Configuration Availability Assessment ("CAA") 2004

This component provides a means of differentiating configuration options with regard to availability in addition to performance and price considerations. It depends on DDS and serves SMA. Inputs are UOS. The output of the component is Estimated MTBF.

The configuration design involves a balance of price, performance and availability. This module is used to provide a basis of availability comparison in the decision process.

Figure 24:
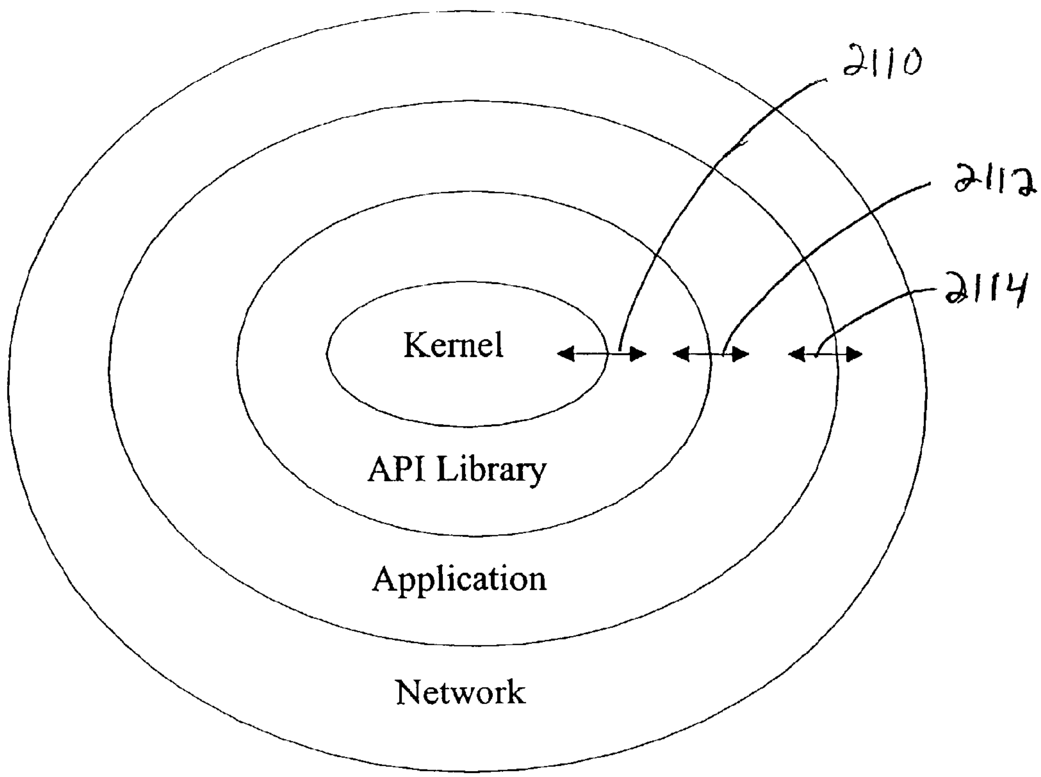
FIG. 24 is a graphical representation of one embodiment of system interface boundaries.

FIG. 24 depicts typical interface boundaries between process layers in a computing system. Thus, as represented by line 2110, kernel layer processes may communicate with API library layer processes. As represented by line 2112, API library layer processes may communicate with application layer processes and, as represented by line 2114, application layer process may communicate with network layer processes.

In one embodiment of the invention the process blocks of FIGS. 15–23 are associated with the process layers of FIG. 24 as follows. The file system encapsulation and the I/O scheduler may be associated with the kernel layer. The logical device configuration, storage management agent/broker, storage performance monitoring, file system encapsulation, security and access control, utilization and performance management, replication services, subscription workload, NFS automount map services and I/O scheduler may be associated with the API library layer. All of the process blocks may be associated with the application layer. All of the process blocks except for storage performance monitoring, file system encapsulation and I/O scheduler may be associated with the network layer.

Figure 25:
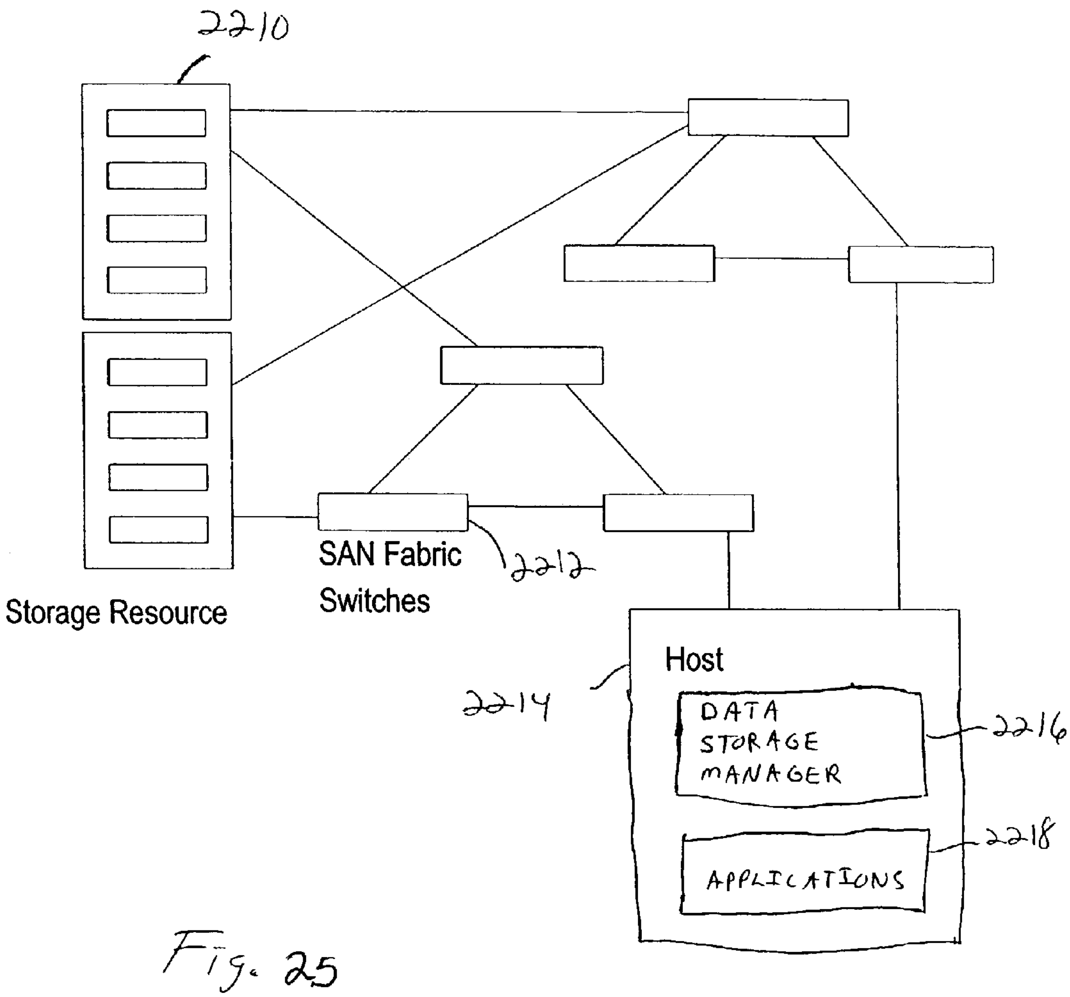
FIG. 25 is a block diagram of one embodiment of a data storage system constructed in accordance with the invention.

FIG. 25 depicts one embodiment of a distributed data storage system. Here, applications executing on a host processor 2214 access data storage resources 2210 through one or more SAN fabric switches 2212. In accordance with one embodiment of the invention, a data storage manager 2216 may control the SAN fabric switches 2212 to allocate data storage resources for the applications 2218. As discussed herein, the criteria for determining matching storage resources and application workloads may depend on desired, measured and estimated response times for the application workloads.

In summary, the system may automate storage configuration design, resource provisioning, resource configuration, file system configuration and OS configuration of the I/O sub-system data path. The system may track application behavior over time, and track the capabilities of storage resources as they are introduced. Resources may be allocated with specific intent, based on application requirements, a service level specification, and accounting for the impact and interaction with other applications that may be sharing the resource.

Thus, the embodiments described herein may provide real-time determination of an application's I/O requirements, even those requirements that differ within a logical volume. These requirements may be mapped to storage resources, satisfying a system of price, availability, performance and utilization constraints. Service Level Specifications ("SLS") may be achieved and maintained through deterministic, dynamic allocation and monitoring of storage resources. As a result, operation beyond the knee of the curve and associated costly interruptions of service may be avoided, while increased levels of I/O performance are achieved thereby providing higher productivity and increased system up-time.

It should be appreciated that the inventions described herein are applicable to and may utilize many different data storage systems.

It should also be appreciated that the inventions described herein may be constructed using a variety of physical components and configurations. For example, a variety of hardware and software processing components may be used to implement the functions and components described herein. These functions and components may be combined on one or more integrated circuits.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet).

A wide variety of devices may be used to implement the data memories discussed herein. For example, a data memory may comprise one or more RAM, disk drive, SDRAM, FLASH or other types of data storage devices.

In one embodiment, the system designed leverages from and integrates into existing operating system capabilities. For example, UNIX facilities such as lex, yacc, rdist, make, sccs, and ndbm may be used. The use of private VPN technology allows a "trusted host" environment, with high security using standard network connections for the leverage of these utilities. Thus, a system design may exploit standard UNIX utilities in a trusted VPN.

In summary, the invention described herein teaches improved techniques for managing application workloads and data storage resources. While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method of managing data storage comprising:

monitoring I/O activity associated with at least one range of addresses in an application address space; and associating at least one data storage device with the at least one range of addresses according to the I/O activity associated with the at least one range of addresses wherein monitoring I/O activity comprises:

generating a profile of at least one data storage device;

determining a load level of the profiled data storage device;

determining a probability distribution of a workload associated with the profiled data storage device; and determining I/O capacity for a workload associated with the profiled data storage device according to the profile, the load level and the probability distribution.

2. A method of managing data storage comprising:

monitoring I/O activity associated with at least one range of addresses in an application address space; and associating at least one data storage device with the at least one range of addresses according to the I/O activity associated with the at least one range of addresses wherein monitoring I/O activity comprises;

identifying a plurality of response characteristics of at least one data storage device to a plurality of application workloads;

and identifying a response time of the at least one data storage device to at least one of the application workloads; and wherein associating comprises defining a stripe width of a RAID data storage device associated with at least one range of addresses.

3. The method of either of claim 1 or 2 wherein associating comprises:

mapping physical address space associated with the at least one data storage device to logical address space associated with the at least one range of addresses.

4. The method of either of claim 1 or 2 wherein the at least one range of addresses comprises a portion of a logical volume.

5. The method of either of claim 1 or 2 wherein the at least one range of addresses comprises a plurality of ranges of addresses in an application address space.

6. The method of either of claim 1 or 2 wherein the I/O activity comprises at least one of the group consisting of response time and data access type.

7. The method of either of claim 1 or 2 wherein the I/O activity is associated with a unit-of work.

8. The method of claim 1 further comprising defining the at least one data storage device from at least one of the group consisting of RAID level, stripe size and stripe width.

9. The method of either of claim 1 or 2 further comprising defining the at least one data storage device from at least one of the group consisting of at least one disk drive and at least one solid state device.

10. A method of managing data storage comprising:

defining a plurality of address ranges within a logical address space;

associating a plurality of data storage devices with the address ranges; and defining a logical volume associated with the data storage devices;

wherein associating comprises defining the data storage devices according to I/O activity associated with the address ranges;

wherein selecting the data storage devices according to I/O activity comprises:

generating a profile of a data storage resource;

determining a load level of the data storage resource;

determining a probability distribution of a workload associated with the data storage resource; and determining I/O capacity for a workload associated with the data storage resource according to the profile, the load level and the probability distribution.

11. A method of managing data storage comprising:

a plurality of address ranges within a logical address space;

associating a plurality of data storage devices with the address ranges; and defining a logical volume associated with the data storage devices;

wherein associating comprises defining the data storage devices according to I/O activity associated with the address ranges; wherein selecting the data storage devices according to I/O activity comprises;

identifying a plurality of response characteristics of at least one data storage device to a plurality of application workloads and identifying a response time of the at least one data storage device to at least one of the application workloads; and defining a stripe width of a RAID data storage device associated with at least one of the address ranges.

12. The method of claim 10 wherein defining the data storage devices comprises selecting at least one of the group consisting of RAID level, stripe size and stripe width.

13. The method of either of claim 10 or 11 wherein defining the data storage devices comprises selecting at least one of the group consisting of a disk drive and a solid state device.

14. The method of either of claim 10 or 11 wherein the I/O activity comprises at least one of the group consisting of response time and data access type.

15. The method of either of claim 10 or 11 wherein the I/O activity is associated with a unit-of-work.

16. A method of managing data storage comprising:

identifying at least one response characteristic of at least one of the data storage devices;

determining at least one probability distribution of application workloads associated with the at least one data storage device; and determining a response time for at least one of the application workloads according to the at least one response characteristic and the at least one probability distribution to characterize I/O activity associated with at least one range of addresses in an address space associated with at least one application; and associating at least one data storage device with the at least one range of addresses according to the I/O activity associated with the at least one range of addresses.

17. The method of claim 16 wherein the at least one response characteristic defines, for the at least one data storage device, response times relative to load levels.

18. The method of claim 16 wherein the at least one probability distribution defines a percent of I/O activity associated with the at least one data storage device.

19. The method of claim 16 further comprising determining a utilization level of the at least one data storage device according to the response time.

20. A method of managing data storage comprising:

defining a plurality of address ranges within a logical address space associated with an application;

identifying at least one response characteristic of at least one data storage device;

determining at least one probability distribution of application workloads associated with the at least one data storage device; and determining a response time for at least one of the application workloads according to the at least one response characteristic and the at least one probability distribution to characterize I/O activity associated with the address ranges;

associating a plurality of data storage devices with the address ranges; and defining a logical volume associated with the data storage devices.

21. The method of claim 20 wherein the at least one response characteristic defines, for the at least one data storage device, response times relative to load levels.

22. The method of claim 20 wherein the at least one probability distribution defines a percent of I/O activity associated with the at least one data storage device.

23. The method of claim 20 further comprising determining a utilization level of the at least one data storage device according to the response time.

24. The method of any of claims 1, 2, 10, 11, 16, or 20, further comprising the step of:

providing a workflow name space for associating storage resources with business processes that consume said storage resources.

* * * * *